(12) United States Patent  
Licis

(10) Patent No.: US 7,155,612 B2  
(45) Date of Patent: Dec. 26, 2006

(54) DESKTOP DATABASE DATA ADMINISTRATION TOOL WITH ROW LEVEL SECURITY

(75) Inventor: Norman D Licis, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 10/427,038

(22) Filed: Apr. 30, 2003

(65) Prior Publication Data

US 2004/0250098 A1  Dec. 9, 2004

(51) Int. Cl.  
*H04L 9/00* (2006.01)

(52) U.S. Cl. ............... 713/182; 713/182; 713/189; 713/193

(58) Field of Classification Search ............ 713/182, 713/187, 189, 193  
See application file for complete search history.

(56) References Cited

U.S. PATENT DOCUMENTS

| | | | | |
|---|---|---|---|---|
| 5,649,185 | A | * | 7/1997 | Antognini et al. ............. 707/9 |
| 5,687,363 | A | * | 11/1997 | Oulid-Aissa et al. .......... 707/4 |
| 5,751,949 | A | | 5/1998 | Thomson et al. |
| 5,787,428 | A | | 7/1998 | Hart |
| 5,937,414 | A | * | 8/1999 | Souder et al. .............. 707/203 |
| 6,085,191 | A | | 7/2000 | Fisher et al. |
| 6,321,201 | B1 | | 11/2001 | Dahl |
| 6,336,114 | B1 | | 1/2002 | Garrison |

FOREIGN PATENT DOCUMENTS

| | | |
|---|---|---|
| JP | 4-347747 | 12/1992 |
| JP | 10-232811 | 9/1998 |
| JP | 2001-117805 | 4/2001 |
| WO | WO 95/22792 | 8/1995 |

OTHER PUBLICATIONS

*Dealing with server corruption in weakly consistent replicated data systems*, Mike J. Spreitzer, Marvin M. Theimer, Karin Petersen, Alan J. Demers and Douglas B. Terry, Computer Science Laboratory, Xerox Palo Alto Research Center, Wireless Networks 5 (1999) pp. 357-371.

*Integrating segmentation and paging protection for safe, efficient and transparent software extensions*, Tzi-cker Chiueh, Ganesh Venkitachalam, Prashant Pradhan, Computer Science Department, State University of New York at Stony Brook, 17th ACM Symposium on Operating Systems Principles, Dec. 1999, pp. 140-153.

* cited by examiner

*Primary Examiner*—Thomas R. Peeso  
(74) *Attorney, Agent, or Firm*—Delio & Peterson, LLC; Kelly M. Nowak; James J. Cioffi

(57) ABSTRACT

A security scheme method and system for authorizing users to access and read data within a table, while only being able to modify selected data rows based on the user's authorities set by a composite of authorities within security tables of the system. Therein, a user of the invention is allowed to retrieve any data from a table while the security scheme limits that data the user is allowed to modify by setting the limit rules within these security tables. These limit rules may simultaneously monitor a plurality of field names existing within selected tables. The security scheme also enables the security tables to automatically open and close access to tables or quads by the security scheme setting flags before, during, after, or combinations thereof, the running of a session for loading tables.

20 Claims, 15 Drawing Sheets

SCPE.USERID_S

| Field | Definition | Key | Description |
|---|---|---|---|
| D | Char (08) | Y | User Identifier |
| NAME | Char (50) | N | Source location |
| INTERNET_ADDRESS | Char (80) | N | Internet address |
| LOCATION | Char (32) | N | Home Location of User |
| PHONE_NUM | Char (20) | N | Phone Number of User |
| UPDATE_OVERRIDE | Char (1) | N | Allows User system access when system is closed |
| PGM_ID | Char (08) | N | Program Name/Userid |
| LAST_UPDATE | Timestamp | N | Timestamp of last update |
| EMAIL_ADDRESS | Varchar (255) | N | Lotus Notes address |

All non-key fields will be NOT NULL with DEFAULT (blank).
UPDATE_OVERRIDE will have a default value of 'N'.

FIG. 2A

SCPE.QUAD_S

| Field | Definition | Key | Description |
|---|---|---|---|
| QUAD_NAME | Char (08) | Y | Quad |
| SUBSYSTEM | Char (08) | N | Subsystem quad resides |
| UPDATE_ALLOW | Char (1) | N | Quad level switch |
| UPDATE_ALLOW_DATE | DATE | N | Date Quad will be opened |
| UPDATE_ALLOW_TIME | TIME | N | Time Quad will be opened |
| QUAD_DESC | Char (50) | N | Quad description |
| PGM_ID | Char (08) | N | Program Name/Userid |
| LAST_UPDATE | Timestamp | N | Timestamp of last update |

FIG. 2B

SCPE.ROLE_TABLE-REF_S

| Field | Definition | Key | Description |
|---|---|---|---|
| ROLE_NAME | Char (10) | Y | Foreigh key Role.Role_Name |
| QUAD_NAME | Char (08) | Y | Foreign key Quad.Quad_Name |
| TABLE_NAME | Char (27) | Y | Table name |
| UPDATE_ALLOW | Char (1) | N | Table level switch |
| PGM_ID | Char (08) | N | Program Name/Userid |
| LAST_UPDATE | Timestamp | N | Timestamp of last update |

FIG. 2C

SCPE.USER_ROLE_AUTH_S

| Field | Definition | Key | Description |
|---|---|---|---|
| USER_ID | Char (08) | Y | Foreign key Userid.User_Id |
| QUAD_NAME | Char (08) | Y | Foreign key Quad.Quad_Name |
| ROLE_NAME | Char (10) | Y | Role_Name to associate rule |
| FIELD_NAME | Char (18) | Y | Field requiring restriction |
| VALUE_AUTH | Char (32) | Y | Authorized Value |
| AUTH_NO | Interger | Y | Authorization Number |
| PGM_ID | Char (08) | N | Program Name/Userid |
| LAST_UPDATE | Timestamp | N | Timestamp of last update |

FIG. 2D

SCPE.UPDATE_OVERRIDE_S

| Field | Definition | Key | Description |
|---|---|---|---|
| USER_ID | Char (08) | Y | Foreign key Userid.User_Id |
| QUAD_NAME | Char (08) | Y | Foreign key Quad.Quad_Name |
| ROLE_NAME | Char (10) | Y | Role_Name to associate rule |
| UPDATE_OVERRIDE | Char (1) | | Allows User system access when system is closed |
| PGM_ID | Char (08) | | Program Name/Userid |
| LAST_UPDATE | Timestamp | | Timestamp of last update |

FIG. 2E

SCPE.USERID_S

| User_ID | Name | Internet Address | Location | Phone_Num | Update Override | Email Address |
|---------|------|------------------|----------|-----------|-----------------|---------------|
| NLICIS | Norm | nlicis@ | Fishkill | 123-4567 | N | nlicis/pok |

SCPE.QUAD_S

| Quad_Name | Subsystem | Update Allow | Update Allow Date | Update Allow Time | Quad Desc |
|-----------|-----------|--------------|-------------------|-------------------|-----------|
| SCPE | DB2F | Y | - | - | SJ_quad |

SCPE.ROLE_TABLE_REF_S

| Role_Name | Quad_Name | Table_Name | Update_Allow |
|-----------|-----------|------------|--------------|
| CAPACITY | SCPE | STOMIN. PLANNED_CYCLE_TIME | Y |
| CAPACITY | SCPE | STOMIN. PLANNED_YIELD | Y |
| CAPACITY | SCPE | STOMIN. PN_WC_CONSUMP | Y |
| CAPACITY | SCPE | STOMIN. PROC_CNSTR_PN_XREF | Y |
| CAPACITY | SCPE | STOMIN. PROC_CNSTR_PN_XREF | Y |
| CAPACITY | SCPE | STOMIN. PROCESS_CNSTR | Y |
| CAPACITY | SCPE | STOMIN. PROCESS_CNSTR_CAP | Y |
| CAPACITY | SCPE | STOMIN. STAGE_CAPACITY | Y |
| CAPACITY | SCPE | STOMIN. WC_PROCESS_CONSUMP | Y |
| CAPACITY | SCPE | STOMIN. WORK_CENTER | Y |
| CAPACITY | SCPE | STOMIN. WORK_CTR_CAPACITY | Y |
| REWORK_PLANNER | SCPE | STOMIN. REWORK_PLANNER | Y |
| REWORK_CYCLE_TIME | SCPE | STOMIN.REWORK_CYCLE_TIME | Y |
| REWORK_MATERIALS | SCPE | STOMIN. REWORK_MATERIALS | Y |
| REWORK_YIELD | SCPE | STOMIN.REWORK_YIELD | Y |

FIG. 10

DESKTOP DATABASE DATA ADMINISTRATION TOOL WITH ROW LEVEL SECURITY

BACKGROUND OF THE INVENTION

1. Field of the Invention

The present invention relates generally to computer systems and, in particular, to a method and security system scheme for controlling user access to and manipulation of rows of data within a table residing in a database.

2. Description of Related Art

The rapid growth of personal computers, internet applications, and distributed computing, along with expanded personal security requirements has proliferated the need for security systems in order to limit the access to database information to authorized users. Computer accessible databases are well known and typically configure data in tables having rows and columns. In these database systems, it is usual for a number of users to be able to interact with the system and to utilize the database. However, problems occur where the database contains information or data which is in some way sensitive, confidential, or is to be available only for a certain user or a member of a certain class of users.

In order to restrict the data available to the user or class of users, security schemes are commonly implemented in relation to these databases in order to secure the information contained therein. Over the years, a number of security systems have been developed for controlling and maintaining which users have access to information contained within tables residing on a database.

For example, database software exists for securing data within tables in the database whereby the data contained in the data, or server tables thereof, is secured in horizontal or vertical manners. Such systems include software that limits access to entire server tables to authorized users, as well as limiting access to selected rows or columns of individual tables to authorized users. This is done by an administrator of the system using predefined software syntax of one or more subsets of the tables known generally as views. Views are subsets of data that are typically used to limit a user's access to data within tables by either hiding certain columns and rows from the user's viewing, or alternatively, by limiting the user's access to specifically designated columns and rows. Often, a view will limit a user's access to data within a table by the view matching the user with their respective user log-on identification (ID) that is stored in the server computer.

However, when a table within a database contains a large number of data rows, or horizontal data slices, the use of views are limited as the administrator of the system must create an individual view for every row of data within the table. Wherein a table contains an exceedingly large number of data rows, such as those containing thousands of data rows, the administrator would require creating views for all of these data rows. Not only is this process time consuming and tedious, it is also less than desirable as the data row security may change over time. When a data row security parameter changes, or requires changing, any views that reflect these changes must also be created before the new security can be used, thus, making this process even more time consuming and tedious.

Another example of the existing software for securing data within tables in a database, or server tables, is by replicating the data within such tables. In replication processes, each user is provided with its own copy of the data table, or that part of the data table the user is attempting to access, for which it is appropriate for the particular user to have access to. Replication software requires that this data be replicated for each individual user, thus, resulting in at least some of the data existing in more than one copy. However, once any data row is changed or altered by any of the authorized users, all of the same data rows within each replicated copy must also be modified to reflect any of the particular changes made by authorized users. This is not only time consuming and tedious, but replication software is also very ineffective and inefficient in terms of memory usage.

Other methods and systems of securing data within a table residing on a database include controlling access to such data by associating security tags for each user and/or each data row in the tables. Security tags typically indicate that the data they are associated therewith have particular attributes, such as, security classifications. However, as security tags exist for each row of data within the table, the storage of such security tags consume a significant amount memory, and are thus, also inefficient in terms of memory usage as well as being time consuming and tedious.

Data residing in tables on a database can also be secured using a single security authority within the tables, such as, securing access to data based on a user's logon identification. However, screening data using such systems requires that the server determine those rows of data that are inaccessible to certain users, which often, takes an exceedingly long time, particularly when there are numerous rows of data. Further, these security systems continually restrict user access from all tables that the user is not given authority to access, therein also restricting users from read only access to such tables. These continued denied requests for accessing tables that a user is not authorized to access can be both frustrating and time consuming for the end user, as well as being inefficient and ineffective in providing security to future generations of technology.

As the computer related arts continue to grow and expand with new technology, continued efforts in preventing unauthorized users from accessing restricted data within tables residing in a database on a network are required. Otherwise, not only will confidential information be obtained by these unauthorized persons, but also the table, database and network would be open to acts of sabotage.

Thus, a need continues to exist for providing improved security systems that effectively and efficiently restrict unauthorized users from accessing database information, particularly data within a table, on a network.

SUMMARY OF THE INVENTION

Bearing in mind the problems and deficiencies of the prior art, it is therefore an object of the present invention to provide an efficient, fast, effective and economical security method and system for preventing unauthorized users from accessing restricted data within tables residing in a database on a network.

It is another object of the present invention to provide a security method and system that allow for entire table sets to be readable by a user while restricting the user's update access to a subset of rows within each table of the table set.

A further object of the invention is to provide a security method and system that control time periods that table sets are available to an end user, such as, by closing a set of tables while the security method and system refreshes and/or loads data within each table.

Still another object of the invention is to provide a security method and system that sets up user authorities based on a common field or combination of fields that exist in several different tables within a table set in a easy manner where one rule will apply to many tables.

It is yet another object of the present invention to provide a security method and system for easily and thoroughly effecting security on a data row within a table residing on a database.

Another object of the present invention is to provide a security method and system for providing row level security to a data row within a table on a network with minimal amount of effort and time to implement, and eliminate unavailable down-time for accessing the data in the server tables.

Still other objects and advantages of the invention will in part be obvious and will in part be apparent from the specification.

The above and other objects and advantages, which will be apparent to one of skill in the art, are achieved in the present invention, which, is directed to in a first aspect a method for securing data within a table on a database residing on a server using a security scheme. The method includes providing at least one security table residing on a database. The security table has limit rules for evaluating and monitoring a user's authorities based on a composite of fields within the security table. The user accesses at least one table residing on the database and then the method evaluates whether the user is authorized to access, read data and modify a subset of the data within this table. This is done by the security table applying the limit rules to the user's authorities based on the composite of fields within the security table. The user may then be permitted to access, read data and modify the subset of data within the table if the user is determined to be an authorized user based on the composite of fields.

In the step of accessing the table residing on the database, a logon screen displays a database list to the user at a client computer, the user selects a desired database from the database list and then the user logs onto the database. The user is then validated and a query is sent to the security table to determine selected ones of the plurality of tables that the user is authorized to access, read and modify subsets of data therein. The server then retrieves a quad list from the database. This quad list comprises at least one subset of tables of the selected ones of the plurality of tables that the user is authorized to access, read and modify.

In evaluating the user or users of the invention, once the user(s) logs onto the system, the user or users are assigned to a user role. The user role defines a plurality of read authorities and alter authorities for this user. A user authority set is then determined for each of the user authorized tables from the quad list by associating the user with the assigned user role. This user authority set is then audited against the composite of fields within the security table for the selected at least one table to determine the subset of data within the selected table that the user is allowed to modify.

In the step of permitting the user to access the table, read the data and modify the subset of data, a table list is presented to the user to select a table to create a query for retrieving data from the table. The table list resides on a query generator. Once a desired table is selected from the table list, the user creates a query in the query generator for retrieving a result set there-from. This result set includes a set of column definitions and rows of the selected table. The system then audits this result set against the composite of fields and creates a row authority list for the user. The row authority list includes a composite of valid authorities within the selected table that the user is allowed to modify. A user may then edit the subset of data from the selected table whereby the system audits this subset of data to ensure that the user has a valid authority from the composite of valid authorities thereby the user being authorized to modify this subset of data. Once any or all modifications to the subset of data within the selected table are complete, these modifications may then be stored in accordance with the invention.

Preferably, the method further includes the security table automatically opening and closing access to the table to prevent locking this table from access by other users. This may be done by the security table automatically opening and closing access to the table by setting flags for a session of the security scheme. Alternatively, the security table may automatically open and close access to at least one cell within the at least one table. This security scheme may be implemented using a plurality of security tables of the invention simultaneously. The plurality of fields may be selected from a variety of differing field names existing within the table residing on the database. In accordance with the invention, the subset of data may be an entire data row, a portion of a data row, a plurality of differing data rows and/or a plurality of differing portions of data rows. The user of the invention may be either a system end user or a system administrator.

In a second aspect, the invention is at least directed to a computer program product for securing data within a table on a database residing on a server using a security scheme. The computer program product comprises computer readable program code means for providing at least one security table residing on a database and then evaluating and monitoring a user's authorities based on a composite of fields within the security table using limit rules. The computer program product also comprises code means for the user to access at least one table residing on the database and then the method evaluates whether the user is authorized to access, read data and modify a subset of the data within this table. This is done by the security table applying the limit rules to the user's authorities based on the composite of fields within the security table. The user may then be permitted to access, read data and modify the subset of data within the table if the user is determined to be an authorized user based on the composite of fields.

In a third aspect, the invention is at least directed to a program storage device readable by a machine, tangibly embodying a program of instructions executable by the machine to perform method steps for securing data within a table on a database residing on a server using a security scheme. The method steps include providing at least one security table residing on a database and then evaluating and monitoring a user's authorities based on a composite of fields within the security table using limit rules. The user accesses at least one table residing on the database and then the method evaluates whether the user is authorized to access, read data and modify a subset of the data within this table. This is done by the security table applying the limit rules to the user's authorities based on the composite of fields within the security table. The user may then be permitted to access, read data and modify the subset of data within the table if the user is determined to be an authorized user based on the composite of fields.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2 illustrates the preferred security tables of the security scheme system of FIG. 1.

FIG. 10 illustrates tables of sample data row results in accordance with the security scheme system of the desktop database administration tool with row level security as shown in FIG. 1.

DESCRIPTION OF THE PREFERRED EMBODIMENT(S)

Figure 1:
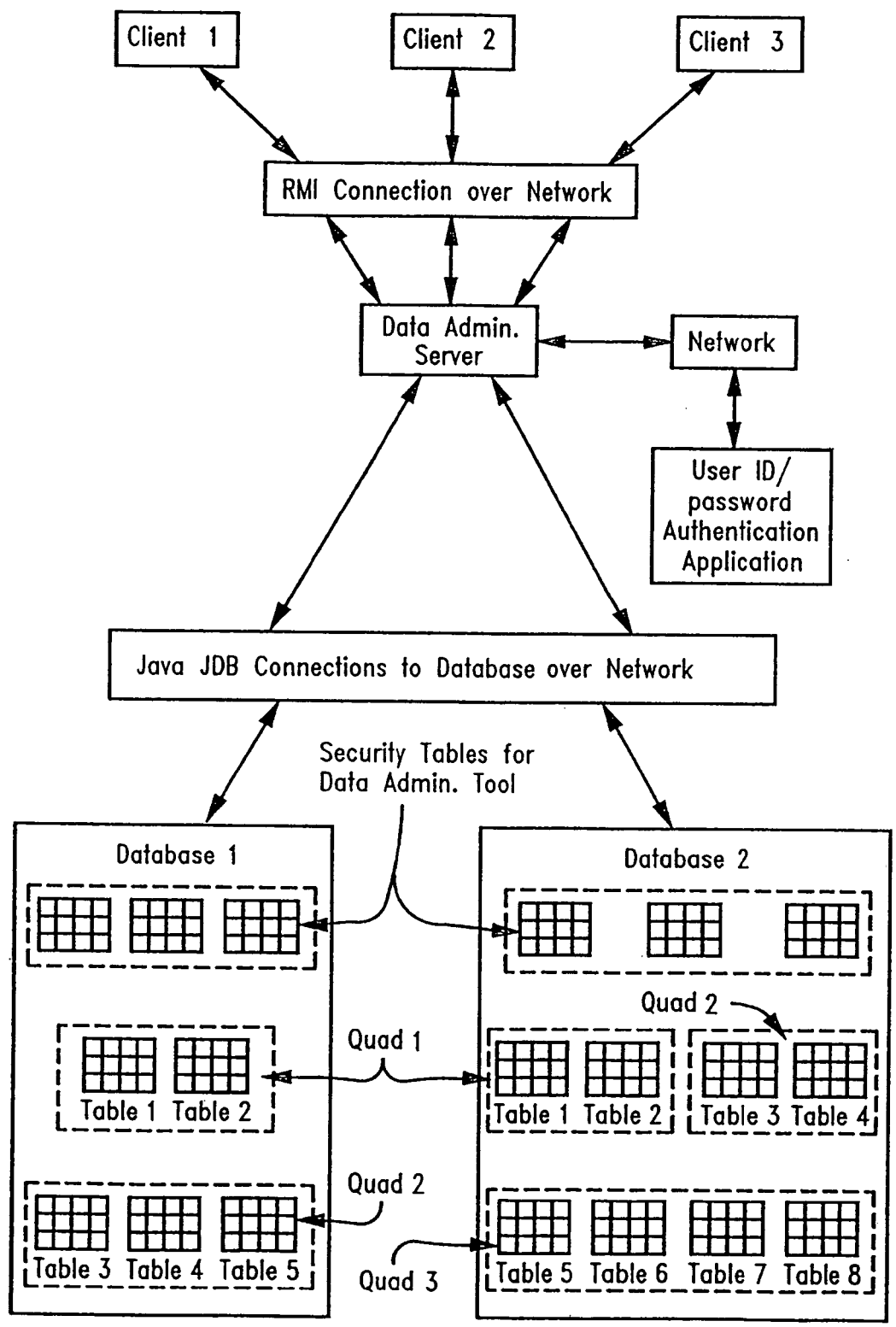
FIG. 1 illustrates a schematic of the security scheme system of the present desktop database administration tool with row level security.

In describing the preferred embodiment of the present invention, reference will be made herein to FIGS. 1–7 of the drawings in which like numerals refer to like features of the invention. Features of the invention are not necessarily shown to scale in the drawings.

Definitions relevant to the present invention are as follows:

Client—the end user application complete with a Logon screen, Quad Selector, Data Manipulator and Query Generator. It makes database requests with Sequence Query Language (SQL) to the server using java's Remote Method Invocation (RMI) as the network interface. The RMI uses the server node name and a designated port (socket) for communication between a client and the server.

Database—A set of data tables that can reside anywhere within a network.

Server—Code continuously running on a server machine. It listens for client requests on a java RMI network interface. When it receives the request, it uses a "super userid" to access the database, processes the SQL request using a jdb port (java database port) and returns the result to the requesting client.

Quad set—Set of tables that have been partitioned into a unique work group of tables called "Quads." The availability of a quad is checked at logon, and rechecked each time a database request is made, whether it be a pulling of data or a storing of data. If a quad is unavailable the pull or store will not be allowed.

Super Userid—Is one userid that is setup for database access. The idea is to have this id have full access to the tables the end users can access. And control the end user's access based on the security scheme that is defined in the document.

Table column definition—how a particular table column is defined within a database.

Table authority set—A set of rows derived from the instant security scheme that determines the set of values, i.e., composite of fields, that the user is allowed to access, read and modify Modify—update, insert and delete data based on rules set up for a particular table.

User roles—A role is a responsibility the end user has to perform their function or job. This function or job then translates into a set of tables the user will need access to read and alter in order to perform that role.

Alter—a user can insert, update and delete data rows from the table(s).

Key Field—one or more columns that are identified as such in a description of a table, an index, or a referential constraint. The same column can be part of more than one key. A key composed of more than one column is called a composite key.

The instant invention relates to a security scheme that authorizes users based on a composite of fields within a security table to access and modify a data row within a table residing in a database. A user of the invention is allowed to retrieve any desired data from a particular table within the database while the unique security scheme of the invention limits that data the user is allowed to modify by setting limit rules within these security tables. The limit rules are incorporated into the security tables thereby enabling the simultaneous monitoring of a plurality of differing field names that may exist within the selected tables such as, but not limited to, the fields as denoted in the below examples of the invention, i.e., location, stage, work-center, process and the like. However, as will be understood in accordance with the foregoing description of the preferred embodiment of the invention, the instant security scheme may be used for any field name denoted within a table, and in particular, with any key fields denoted within tables residing on a database.

The security scheme controls the particular data that an end user is allowed to modify or manipulate within a table by assigning each individual user to particular user roles. As the user logs onto the system, the instant security scheme evaluates the user by finding the set of tables the user is allowed to read and modify based on the roles they are identified with. This is done by the system evaluating the user and determining the data that the user is allowed to update in accordance with the limit rules set for that particular user in the security tables based on a composite of fields for such user. In evaluating the user, the system determines whether the user is authorized to access a table and read all data therein the table, while limiting that data the user is allowed to modify, such as, only allowing the user to modify a subset of such data. However, this subset of data may include all the data within the table, a data row, a portion of a data row, a plurality of data rows, portions of a plurality of data rows and the like. Thus, once the user pulls data from the database table via a query the authority set for that user is determined and applied so that the user is only allowed to modify that data that the user is authorized to edit, while having full read access to all data rows within the table.

In more detail, the instant security scheme controls access to particular rows of data within a table or group of tables residing on a database, and the editing of such data therein by an end user, using a set of limit rules within the security tables that audit the user's authorities based on a combination of columns. This security scheme audits each end user based on the composite of authorities of accessing and modifying data within a table set for that particular user, such as, by having different access threads which do not include the same columns and/or values. The security scheme is aimed at overcoming the problems in the prior art, as set forth above, by providing security tables that enable easy, efficient, fast and reliable access to, and updating thereof, rows of data within a table or within multiple tables based on a composite of end user authorities. This security scheme is preferably implemented on multiple tables simultaneously such as, for example, by allowing access to be set up for a similar column name across multiple tables by associating those tables to a role_name (as shown below in reference to examples 1–11.) The invention also enables the security tables to automatically open and close access to tables or quads by the security scheme setting flags before, during, after, or combinations thereof, the running of a session for loading tables.

In a preferred embodiment of the invention, the instant security system includes a row level authority security scheme for the data within a database table. This row level authority scheme allows a user to be able to read any data from a table they have been granted access to, but limits the data they can alter. The security system includes a system administrator, such as, a Data Administration tool shown in FIG. 1. The system administrator enables the opening and closing availability of the tables, or optionally, selected portions or cells within the tables, as well as opening and closing certain portions of the database. This is done by the security scheme setting flags before, during, after, or combinations thereof, the running of a session for loading tables. The flags exist on the tables and quad level, whereby the flags can be set to make either at least one cell within the table, the entire table or a quad unavailable for read or alter activities, respectively. In accordance with the invention, this may be accomplished manually by the system administrator or automatically by a program that is running the load process.

The security system also includes a number of screens viewable by an end user at a client computer. For example, an end user's authorization with respect to certain ones of a plurality of authority threads for a given table is displayed to the end user via an authorization screen, a quad status screen shows the availability of defined sets of quads and a user status screen shows whether or not the user is logged onto the system. The instant security system further includes copy/paste features, a calculator feature, find/replace utilities, a broadcast message system and export/import features of both generated queries and manipulated data sets. The security system is further provided with the ability to connect to different database subsystems.

Referring to FIG. 1, the security system is part of a Data Administration tool, preferably a three-tier architecture written in java, having at least a client, a server and a database. The administrator also configures and maintains the various databases for use by the users of the invention at their respective client computers. The client may be an end user application complete with a Logon screen, Quad Selector, Data Manipulator and Query Generator, or alternatively, it may be an administrative role of the security system. The administrator has access to the security scheme described herein to setup users and roles, and then associate such users to roles, and open and close the availability of quads and tables. As shown in FIGS. 2A–E, the instant security scheme preferably includes the set of five security tables, namely, USERID_S, QUAD_S, ROLE_TABLE_REF_S, USER_ROLE AUTH_S and UPDATE_OVERRIDE_S tables. This set of security tables exist on each database within the server whereby an end user of the invention has to be in at least one of such databases in order to access and activate the foregoing security scheme system for modification of data within a selected table in the database.

The Data Administration tool sets up the Row Level Authorization schemes, or rules, within the security tables whereby these rules establish those users that have access and modification abilities with respect to particular data rows within particular tables based on the assessment of the composite of fields within the security tables as shown in FIG. 1. Thus, this security scheme determines a set of tables a user has read authority for, while limiting the user's alter authority on the same set of tables based on a composite of fields that may or may not exist in each table within the table set. Based on these authorities for a user, the security tables can limit the data a user can alter by a certain field and value for the purpose of allowing the user to access a table and pull and modify data therein, preferably pull a data row and modify such data row by deleting or updating or by replicating and editing the data row to create an insert. The delete, update and insert action will be allowed as long as all the values in the composite authority are allowed in their respective fields. Further, these security tables continuously audit or check the availability status of a user to access, pull and modify a data row of a table. If it is determined that the user is not authorized to modify a particular data row, the system then marks the row as being restricted and will not allow the row to be stored back to the database.

In the preferred embodiment of the invention, the security tables of this security scheme are defined and shown in FIGS. 2A–E. A unique and critical feature of this invention is that these security tables evaluate an end user based on a combination or composite of authorities associated with each end user, therein allowing the end user to modify data rows within a table only if the user has unrestricted access, i.e., update abilities, with respect to such table. In restricting particular data rows a user can update, insert or delete, the security on a table in a database is defined down to the row level based on "allowable" values within selected key fields of the table.

Referring to FIGS. 2A–E, the first of the security tables of the instant security scheme is the USERID_S table in FIG. 2A. In logging onto the instant security scheme, this table verifies that the user is an authorized user and is authorized to access and modify a table as selected by the user. In so doing, the end user logs onto the instant security scheme system, which is directly installed on the user's client computer, via a log on screen displayed at the client computer. The end user types in a valid userid and a password. The Data Administration tool then verifies the userid and password using any known authorization technique.

The security scheme also includes a QUAD_S table for sub-dividing the database into workable sub units, as shown in FIG. 2B. The quad record may include, for example, the quad name and description, the subsystem that the quad resides in, an update_allow flag to open and close the quad, and an updates_allow_date and update_allow_time to indicate an approximate date and time the quad will reopen, the program name or userid, the time stamp of the last update, and the like.

The security scheme also has a role table, i.e., ROLE_TABLE_REF_S of FIG. 2C, for defining a set of database tables to a role. The role table determines the tables a user has access to based on the roles they are associated with in the USER_ROLE_AUTH_S table.

Once the user has successfully logged onto the security system, the security scheme determines the user's authorities, i.e., those tables that the user is allowed to access and modify, based on the composite of authorities set for that particular user. This is done using the USER_ROLE AUTH_S table in FIG. 2D and the ROLE_TABLE REF_S table in FIG. 2C. The USER_ROLE AUTH_S table is a user authorization table for defining the rows that are "allowable" for the end user of that role to update. The ROLE_TABLE REF_S table is a table list of all tables within the database accessible by the end user.

Referring to FIG. 2D, once the user has successfully logged onto the instant security system, the end user can then select a desired table to connect to by viewing at his client computer a list of tables they have access to within a table list determined by the roles they are associated with. In so doing, the userid must exist in the USERID_S security table of the invention. If the end userid is within the security tables, and thus, the user is a registered user of the invention, the Data Administration tool determines the user's table authorities, i.e., the tables that the user is allowed to access and modify in accordance with the invention. Thus, the USERID_S table identifies the end users of the invention and all authority information associated with each of the end users.

Further, the Data Administrator evaluates a plurality of different columns, either simultaneously or concurrently, to determine all authorities set for the particular user, and thus, the tables that the user is allowed to access and modify, and even further, the different cells or subsets of data of the selected data rows that the user is allowed to access and modify. Wherein a number of data rows, fields or cells are allowed to be modified, the invention preferably modifies one data row at a time, such as by updating, deleting or inserting. However, if the table data to be modified is a set of data rows, the invention may modify fields or cells within that set.

Once the user has been given access to the desired table, the user can create a query in the Query Generator component of the invention to request a desired data row from the table. This data row is loaded into the Data Manipulator component of the invention allowing the user to modify such data by including inserts, updates, deletes and the like into the data row. In so doing, the security scheme includes a "Super UserID" for accessing the tables in the database. The security system uses this Super UserID to enable full access to any of the tables listed within the database, while the security tables simultaneously control each individual end users' accessing and modifying capabilities with respect to those tables that each end user is given the authority to access and modify based on the composite authorities set up in the security rules within the security tables. In so doing, the Super UserID of the system is enabled with insert, update, delete and read access to all the tables defined as accessible by the invention, while the security tables define an end user's specific access and modification allowances for a set of tables within a role.

The system is also adapted with an override table, i.e., UPDATE_OVERRIDE_S of FIG. 2E, for allowing a user to have access to a set of tables within a role, even though the quad the role belongs to may be closed. The purpose of the UPDATE_OVERRIDE_S table is to allow a user who is deemed trustworthy to be able to access tables within a given quad/role when the quad is closed.

An essential component of the invention is that the security scheme allows read access to tables within a database system by associating them to a ROLE_NAME in the ROLE_TABLE_REF_S table, and then, further restricting access to and modification by users of the security scheme by associating them to the ROLE_NAME in the USER_ROLE_AUTH_S table. In so doing, the invention is unique in that data access is controlled by the roles a user is assigned to, whereby the role will have one or more tables associated with it that are identified in the ROLE_TABLE_REF_S table. Thus, in accordance with the invention, when a user is identified with a role in the USER_ROLE_AUTH_S table, they get total read access to all the tables associated with the role. Data restrictions for updating data are applied by adding user rows to the USER_ROLE_AUTH_S table that join with the ROLE_TABLE_REF_S table by QUAD_NAME and ROLE_NAME. One or more fields may be identified with one or more values within a restriction thread, or alternatively, multiple restriction threads may be identified for each user. The threads are determined by having a common USER_ROLE_AUTH_S AUTH_NO value that have common USER_ID, QUAD_NAME AND ROLE_NAME values in the USER_ROLE_AUTH_S table.

A preferred embodiment of the generalized process flow of the instant security scheme system is as follows:

100—START.

200—RETRIEVE DATA.

300—INITIALIZE AUTHORITY SET.

400—LOAD DATA.

500—EDIT DATA.

600—STORE DATA.

700—EXIT.

Figure 3:
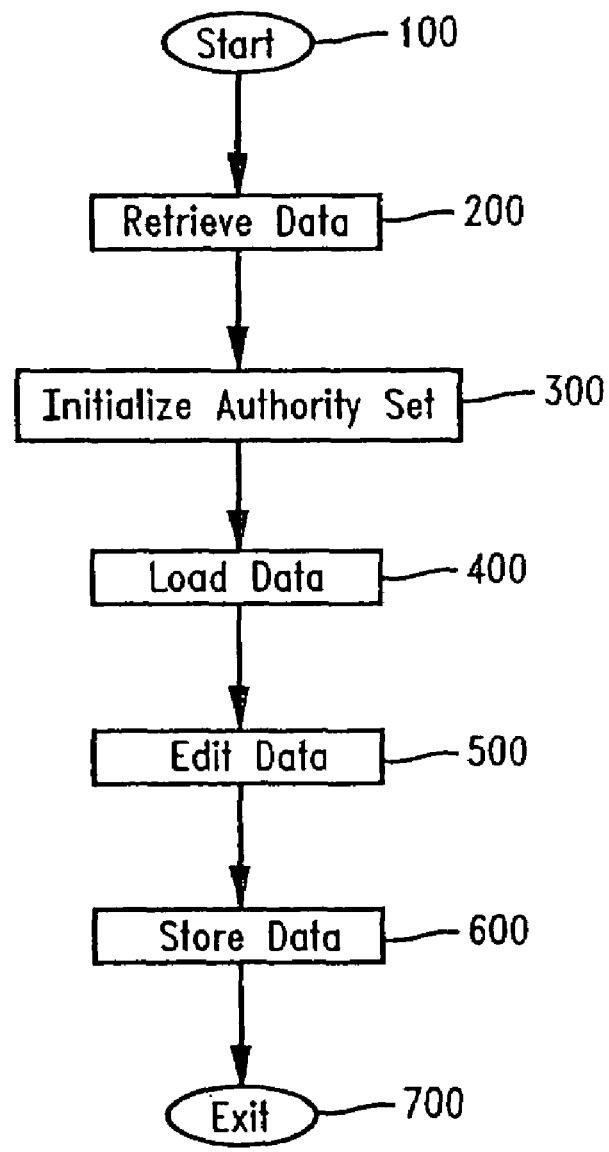
FIG. 3 illustrates a generalized flow of the preferred process of the instant desktop database administration tool with row level security.

FIG. 3 illustrates this generalized process flow of the instant security scheme. In particular, the security scheme system is started (step 100) and then data is retrieved (step 200) and the authority set initialized (step 300). Once initialization is complete, the data is loaded (step 400) and edited (step 500). Once all editing is complete, the data is stored back to the database (step 600), and when the process is complete the system is exited (step 700). A more detail description of the process flow of the security scheme is set forth below in relation to FIGS. 4A–9.

The instant security scheme system will be better understood in accordance with the description below referring to a preferred process flow of the invention, as well as a number of examples of the invention. In the flow charts for the preferred process of the invention, as shown in FIGS. 4A–9, it is to be noted that numerals in circles indicate connections to and from other parts of the flow charts.

100—START.

101—Get database list from the server.

103—Show logon screen on client computer.

105—Authenticate logon on server.

107—Logon successful? If yes, continue to step 110 checking of user identification. If no, continue to step 109 for an invalid logon.

109—Invalid logon. The logon was unsuccessful, and therefore, need to retry logon by continuing to step 119, back to step 103 and repeating subsequent steps.

110—Logon successful. Is userid in security scheme? If yes, continue to step 113. If no, continue to step 111.

111—Invalid Tool userid. Retry logon by continuing to step 119, back to step 103 and repeating subsequent steps.

113—Valid userid. The userid is in security tables, now check to determine whether userid is an administrative role (step 117) or a user role (step 115).

115—The userid is determined to be a user.

117—The userid is determined to be an administrative role.

119—Is there a valid userid associated with a user or administrative role? If yes, continue to step 121. If no, retry step 103 and subsequent steps.

121—Quad set.

Figure 4A:
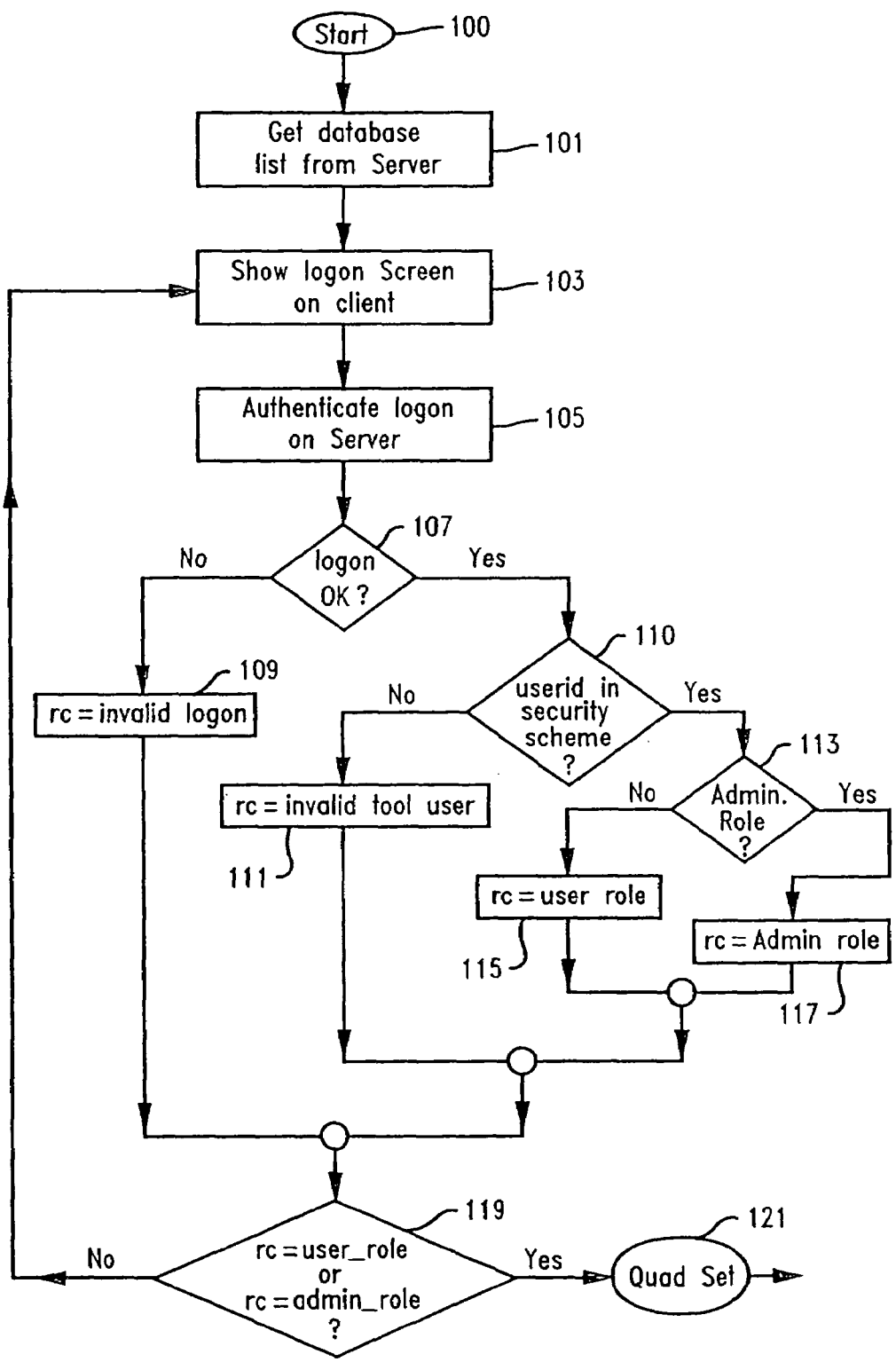
FIGS. 4A–D illustrate the preferred process flow of the "Start" portion of the process flow of FIG. 3.

As shown in FIG. 4A, a user of the instant security system initiates the invention (step 100), a database list is then retrieved from the server (step 101) and a logon screen is displayed to the user at its client computer whereby the logon screen contains the database list (step 103). The database list is created on the server when the server code is initiated on the server. This is preferably done each time the server is recycled, such as, daily. The server code of the system initializes those particular databases that it is allowed to connect to based on a subsystem.ini file. In so doing, the server gets all the column definitions and stores them in a hashtable entry (java data structure) created by the system for each defined database. The hashtable entry is stored in local memory with the database name as the key and a subsystem class object as the entry. For example, the hashtable entry of the invention may include the following components:

public class Subsystem implements Serializable
[ private String subsystem;
private String catalogDbName;
private String databaseName;
private String port;
private String superUserid;
private String password;
private String serverName;
private String description; ]

An essential feature of the hashtable is a composite key comprising the subsystem name and the table name. For each subsystem, the invention further determines table lists contained therein, and then retrieves table column defintions from their respective subsystems and caches them in the server memory for later download by a user. These entries are stored in a hashtable of vectors. In accordance with the invention, the table lists may be determined by unique table_name entries, such as, ROLE_TABLE_REF_S table.

Once the logon screen is displayed at the client computer (step 103), a user starts the security scheme by selecting a desired database from the displayed database list and logs onto the system by providing a userid and password. The logon request is passed to the server and then an authentication scheme authenticates or validates the user logon (step 105) to determine whether the logon was successful (step 107) or unsuccesful (step 109). The authentication scheme may include any known authentication scheme. After the user has been authenicated, the instant security scheme continues to step 107. If the userid and password are invalid, the return code is set as such and returned to the client for reentering the userid and password (step 111). Once the userid and password are authenticated the server then makes a call to the Security tables for the chosen database to determine whether the userid belongs to a user of the invention or the administrator of the system (step 113), using the following SQL query:

SELECT DISTINCT A.ROLE_NAME
FROM SCPE.ROLE_TABLE_REF_S A,
SCPE.USER_ROLE_AUTH_S B,
SCPE.QUAD_S C
WHERE B.USER_ID='userid'
AND B.ROLE_NAME = A.ROLE_NAME
AND B.QUAD_NAME = A.QUAD_NAME
AND C.QUAD_NAME = A.QUAD_NAME
AND C.SUBSYSTEM = 'selected database'

Figure 4B:
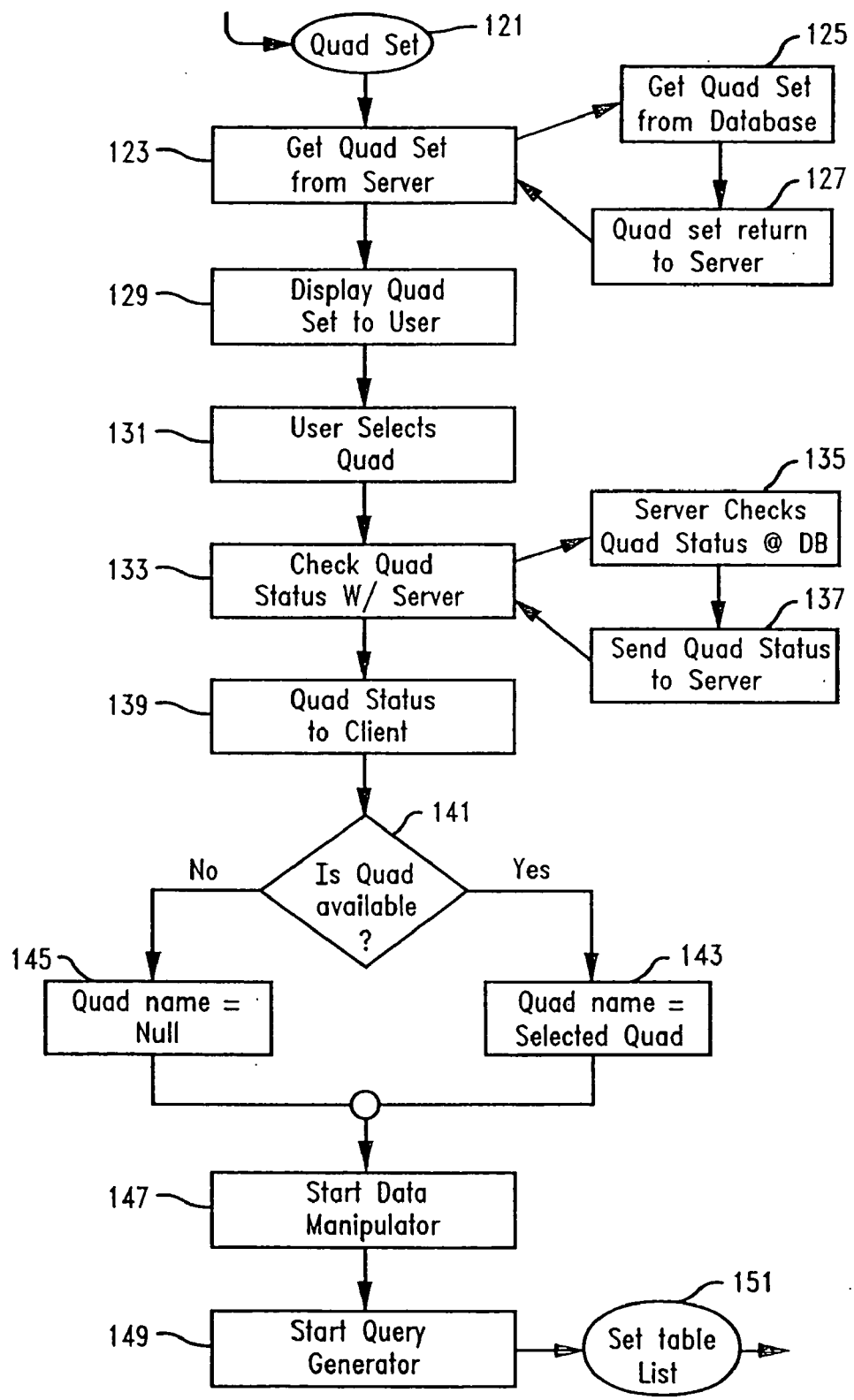

Next, it is determined whether the role_name is associated with a user (step 115) or an administrative role (step 117). In determining whether the userid is an administrative role, the system sets a special role associated with being an administrator of the system, such as, setting the administor role to role_name of SDAADMIN in the ROLETABLE_REF_S and USER_ROLE_AUTH_S tables. If no rows are returned the user is not authorized to use the database and the process is retried back to step 103 and subsequent steps. If the key role_name for an administrator is found in the returned list, the user is determined to be an administrator and the return code is set accordingly. If a list of role_names is returned but none of them are the key administrator role, the user is determined to be a regular user and the return code is set accordingly. If the user logging in has been determined to be an administrator or user, the process continues to step 121, selecting a quad set, as shown in FIG. 4B.

121—Quad set selection.

123—Get quad set from server. A quad set is retrieved from a database (step 125), and then the retrieved quad set is sent to the server (step 127).

129—Display quad set to the user.

131—Select quad. The user selects a desired quad from the quad set.

133—Check quad status with server. The server checks the quad status at the database (step 135), and then sends the quad status to the server (step 137).

139—Send the quad status to the client computer.

141—Determine whether the quad is available. If yes, then continue to step 143. If no, continue to step 145.

143—Quad is available and quad name is the selected quad.

145—Quad is not available, and therefore, quad name is null.

147—Start data manipulator. Once it is determined whether the quad is available, and whether the quad name is the selected quad (step 143) or null (step 145), data manipulation is initiated.

149—Start query generator.

151—Set table list.

In selecting a quad set (step 121), the instant security scheme allows the administrator to partition the tables into quads. A quad is a group of tables within a database that are partitioned or subdivided into a working unit. A user of the invention may have access to at least one quad, or alternatively, a plurality of quads as shown in FIG. 1. A particular quad is available to the end user if the UPDATE_ALLOW flag is set to 'Y' in the QUAD_S table.

Thus, once the user has selected a database and the logon has been successful, the client code calls the server to request the list of quads from the database (step 123). The user is able to view at the client computer those quads that the user has access to, whereby the system prompts the user for a Quad to logon to within the database. If a user does not see the quad that the user would like to connect to, it is because the user is not setup by the system administrator to work with that quad. Wherein the user is allowed to work with a quad, once the quad set is retrieved from the selected database (step 125), this retrieved quad set is sent to the server (step 127). Preferably, the server queries the database for the quad list using the following query:

SELECT DISTINCT QUAD_NAME, UPDATE_ALLOW,
   UPDATE_ALLOW_DATE, UPDATE_ALLOW_TIME,
      REASON_SWITCH, QUAD_DESC
   FROM SCPE.QUAD_S
   WHERE SUBSYSTEM = 'databaseName'
   ORDER BY QUAD_NAME The retrieved quad list or quad set is then displayed to the user at the client computer (step 129) whereby the user may then select a subset of the selected quad set (step 131). This subset of the selected quad set may be the entire quad set, or alternatively, it may be selected portions of the quad subset. The client computer requests the server to check the status of the quad set (step 133) to determine if it is open at the database (step 135) and then sends the quad status to the server (step 137). The server then sends the quad status to the client computer for display by the user (step 139). The server may check the status of the quad to see if it is open using the following query:

SELECT UPDATE_ALLOW
   FROM SCPE.QUAD_S
   WHERE QUAD_NAME = 'quadname'
   AND SUBSYSTEM = 'databaseName'

Figure 4C:
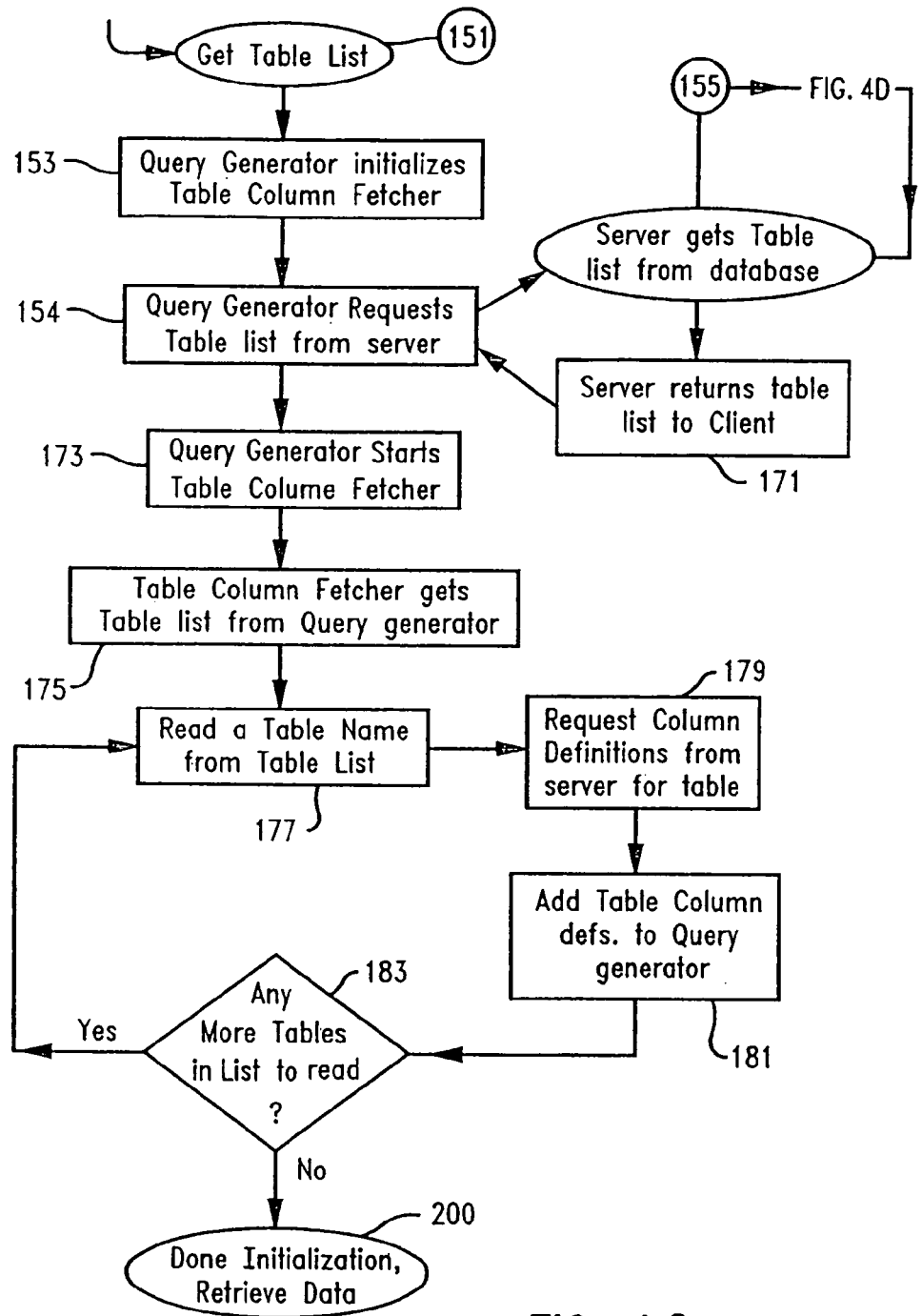
Figure 4D:
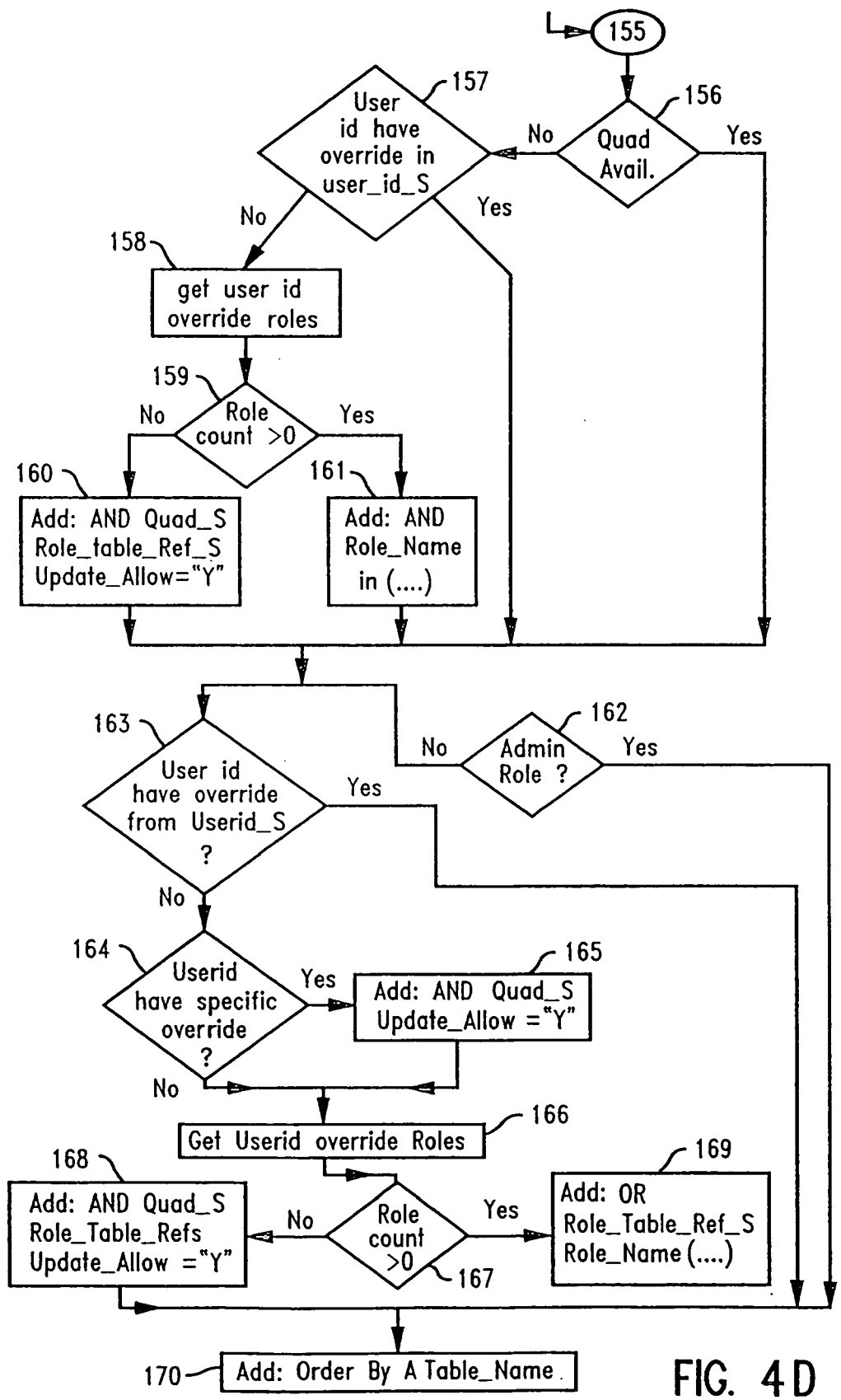
Figure 5:
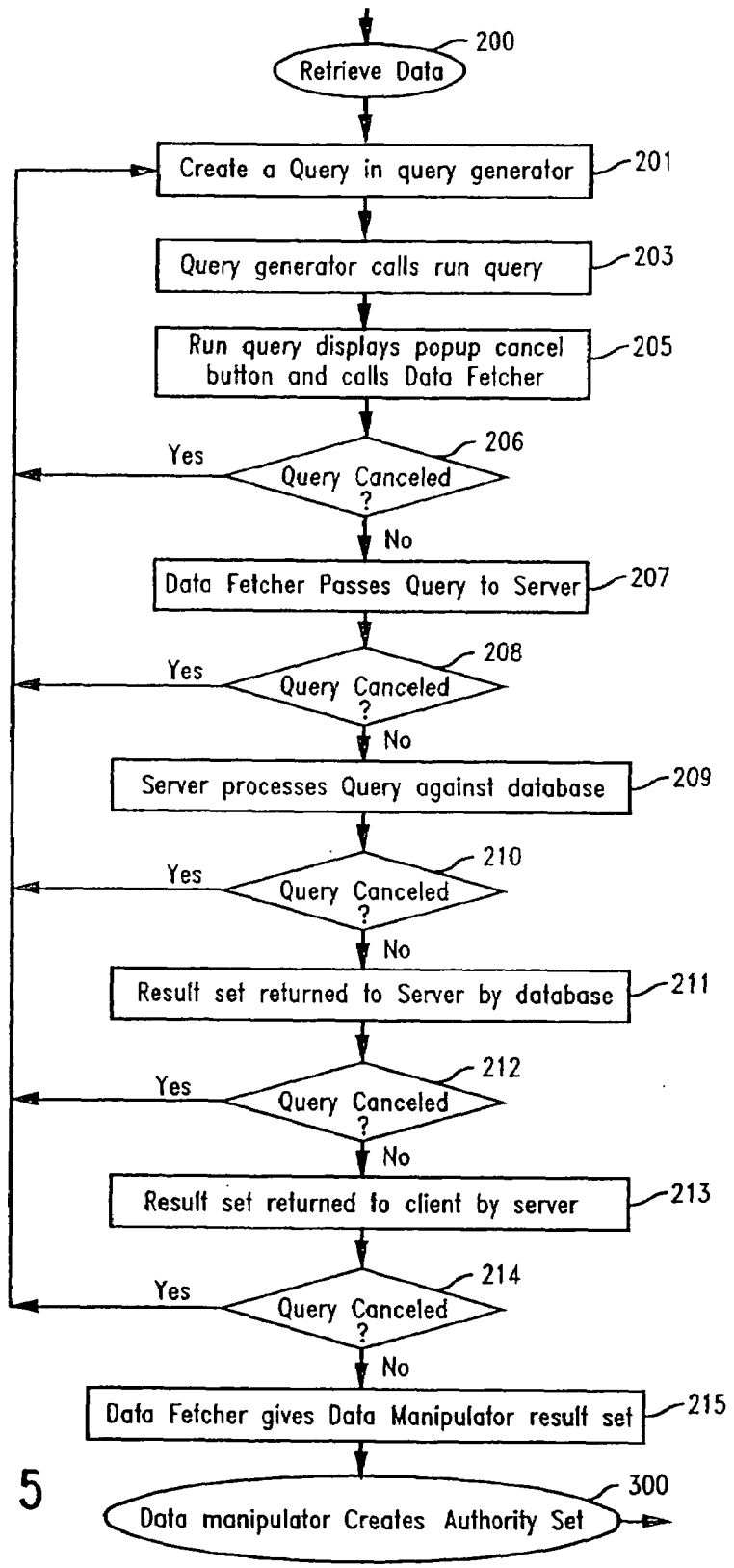
FIG. 5 is a continuation of the process flow of FIGS. 4A–D illustrating the preferred process flow of the "Retrieve Data" portion of the process flow of FIG. 3.

The quad's availability is next determined (step 141). If it is determined that the quad set is available, the user is allowed to access the tables they have authority for within the quad and the quad name is set to the name of the selected quad within the client application (step 143). However, if the quad is not available, the user will not be allowed to access any tables in the particular quad and the quad name is set to null within the client application (step 145). There is a 'Quad Status' screen the user can view to see the status of the quads. The Data Manipulator component of the instant security scheme system is then initiated (step 147) followed by the start query generator (step 149) and the get table list (step 151). Each time a database action is requested by the user of the invention, the QUAD_S table's UPDATE_ALLOW flag is checked. As shown in FIGS. 4C and 4D, the below step of getting the table list creates the SQL query that determines the table list a user has access to whereby the "Adds" get added onto the query.

151—Get table list.

153—Query generator initializes Table Column Fetcher.

154—Query generator requests table list from server. The server retrieves the table list from the security tables associated with the logged user (step 155), and then the server sends the retrieved table list to the client computer (step 171).

156—Quad Available? If yes, go to step 162. If no, go to step 157.

157—Userid have override from USERID_S? If yes, go to step 162. If no, go to step 158.

158—Get userid override roles.

159—Is role count greater than zero? If yes, go to step 161. If no, go to step 160.

160—Add: AND Quad_S Role_table_ref_S, C.UPDATE_ALLOW = "Y" AND A.UPDATE_ALLOW = "Y". Go to step 162.

161—Add: AND A.ROLE_NAME in (role 1, role 2, . . . ,role N). Go to step 162.

162—Admin role? If yes, go to step 170. If no, go to step 163.

163—Userid have override from USERID_S? If yes, go to step 170. If no, go to step 164.

164—Userid have specific override from UPDATE_OVERRIDE_S? If yes, go to step 165. If no, go to step 166.

165—Add: AND Quad_S Role_table_ref_S, C.Update_Allow = 'Y'.

166—Get userid override roles.

167—Role Count greater than zero? If yes, go to step 167. If no, go to step 168.

168—Add: AND Quad_S Role_table_ref_S, C.UPDATE_ALLOW = "Y" AND A.UPDATE_ALLOW = "Y".

169—Add: OR A.ROLE_NAME in (role 1, role 2, . . . ,role N).

170—Add: ORDER BY A.TABLE_NAME.

173—Query generator starts the table column fetcher

175—Table column fetcher retrieves table list from query generator.

177—Read a table name from the table list.

179—Request column definitions from the server for the table

181—Add table column definitions to query generator

183—Any more tables in list to read? If no, then continue to step 200. If yes, go to step 177 and continue reading table list for all tables contained therein.

200—RETRIEVE DATA.

A critical component of the invention is that once the user has selected an open quad from the database, the instant security scheme system starts the Data Manipulator, which in turn, starts the Query Generator, both of which are displayable to the user at the client computer. In accordance with the invention, the Query Generator is used to build a request for data from the database, while the Data Manipulator is populated with the resultant data from the Query Generator request.

Referring to FIGS. 4C and 4D, in getting the table list (step 151) the Query Generator initiates the Table Column Fetcher (step 153) and then gets the table list from the server (step 159). The Query Generator requests from the server a table list that an end user has access to, for the particular quad that the user has selected. In the invention, the table list is determined by looking the user roles up in the USER_ROLE_AUTH_S table and joining that with the tables that are listed for the roles in the ROLE_TABLE_REF_S table.

In retrieving the table list from the database, the server begins building the query that will query the database with the following "Build Table List" query (step 155):

SELECT DISTINCT A.TABLE_NAME
FROM SCPE.ROLE_TABLE_REF_S A,
SCPE.USER_ROLE_AUTH_S B,
SCPE.QUAD_S C
WHERE B.USER_ID = 'userid'
AND B.ROLE_NAME = A.ROLE_NAME AND A.QUAD_NAME = 'quadName'
AND B.QUAD_NAME = A.QUAD_NAME
AND C.QUAD_NAME = A.QUAD_NAME
AND C.SUBSYSTEM = 'databaseName'

In Building the Table List (step 155), it is first determined whether the Quad is available at the database. In particular, a check is made to see if the quad selected by the user is open in the QUAD_S table using the following query (step 156):

SELECT UPDATE_ALLOW

FROM SCPE.QUAD_S

WHERE QUAD_NAME = 'quadname'

AND SUBSYSTEM = 'databaseName'

If the Quad is not available, it is determined whether the user has override privileges (step 157). That is, if the quad selected by the user is NOT open in the QUAD_S table, a check is made to the USERID_S to see if this user has been granted special privilege to access the database using the following query:

SELECT UPDATE_OVERRIDE
FROM SCPE.USERID_S
WHERE USER_ID = 'endUser'

As illustrated in FIG. 4D, if the quad was determined to be closed when it was selected, this user would be granted access to it anyway if the update_override flag is set to 'Y'. However, if the user was not granted carte blanche override in the USERID_S table, a check is made to determining if this user was granted a specific override for a role in the UPDATE_OVERRIDE_S table using the following query (step 158, 159):

SELECT ROLE_NAME

FROM SCPE.UPDATE_OVERRIDE_S

WHERE USER_ID = 'userid'

AND QUAD_NAME = 'quadName'

AND UPDATE_OVERRIDE = 'Y'

If there are roles found in the UPDATE_OVERRIDE_S table, then an "and" statement is added to the selection criteria (step 106). The selection criteria is further filtered based on QUAD_S and ROLE_TABLE_REF_S by adding to the SQL query AND A.UPDATE_ALLOW = 'Y' AND C.UPDATE_ALLOW = 'Y' (step 160). Alternatively, selection criteria may be filtered by adding to the SQL query AND A.ROLE_NAME IN ('role 1','role 2', . . . ,'role n') (step 161) based on role_name's the user has been granted access to in UPDATE_OVERRIDE_S.

It is then determined whether the user is an administrator of the invention or an end-user of the invention (step 162). If the user is an 'admin' then the tables defined for a quad are always available to this admin role and the process flow will continue to step 170. However, if the user of the invention is an end-user at a client computer, it is then determined whether this end-user has override privileges (step 163). If yes, then the process flow continues to step 170. If the end-user does not have Carte Blanc override privileges, it is then determined whether this user has any specific override privileges using the following query (step 164):

SELECT UPDATE_OVERRIDE "
FROM SCPE.UPDATE_OVERRIDE_S "
WHERE USER_ID = 'endUser'
AND UPDATE_OVERRIDE = 'Y'
AND QUAD_NAME = 'quadName'

If any rows are found in the UPDATE_OVERRIDE_S table, it is determined that the end-user does have specific override privileges in step 164, and the following is added to the SQL query: AND A.UPDATE_ALLOW = 'Y' (step 165) and then the Userid override roles are obtained (step 166). If no rows are found in the UPDATE_OVERRIDE_S table for the end user, then an 'and' statement is added to the SQL query selection criteria OR ROLE_TABLE_REF_S role_name in (role1, role2, . . . ,roleN) (step 169). At the end of the query, the lists are ordered by table name by adding ORDER BY A.TABLE_NAME (step 170) to the SQL query.

The query is then run and the table list is returned to the Query Generator and populates a table choice display box viewed at the client computer by the end-user, the Query Generator starts the Table Column Fetcher (step 173), which in turn, gets the Table List from the query generator (step 175). In particular, the Table Column Fetcher requests the definitions of the column's (fields) for each table in the list from the server one at a time. The server references its local copy of column definitions (step 177) and returns them to the Table Column Fetcher on the client side (step 179), which in turn, adds an entry to the Query Generator's table Column Definitions hashtable (step 181). This process is repeated for all the tables within the table list until all of such tables in this list have their respectively definitions retrieved by the server (steps 183, 200).

200—RETRIEVE DATA.

201—Create a query in query generator.

203—Query Generator calls RunQuery.

205—RunQuery displays a popup with a cancel button and calls Data Fetcher.

206—Has the Query been canceled? If yes, go to step 201. If no, go to step 207.

207—Data fetcher forwards query to server.

208—Has the Query been canceled? If yes, go to step 201. If no, go to step 209.

209—Server processes query against database.

210—Has the Query been canceled? If yes, go to step 201. If no, go to step 211.

211—Result set is returned by the database to the server.

212—Has the Query been canceled? If yes, go to step 201. If no, go to step 213.

213—Result set is returned by the server to the client computer.

214—Has the Query been canceled? If yes, go to step 201. If no, go to step 215.

215—Data fetcher loads data manipulator with result set. The popup cancel button is removed and no longer viewable at client computer.

300—INITIALIZE AUTHORITY SET.

Once the quad set is selected and the data administration tool of the instant security scheme system is initialized and ready for the end user to interact with it, data is retrieved from the database (step 200) as shown in FIG. 4. The user brings the query generator to the foreground of the computer display screen, and then the user creates a query in the query generator in order to draw data from a desired table (step 201). Preferably, this is performed on one table at a time. Once the query has been formulated, the user may then choose to run the query (step 203). In so doing, the query is passed to a RunQuery GUI (Graphic User Interface), which passes the query to a Data Fetcher for interaction with the server. The RunQuery GUI purpose is to display a cancel button should the user decide to cancel the query during the steps of retrieving data (steps 205, 206, 208, 210, 212, 214). The Data Fetcher forwards the query to the server (step 207) and the server processes the query against the database (step 209). The system then awaits the result set. Optionally, if it is determined that the session is taking too long, the cancel button may be used by the end-user to cancel the running query (steps 206, 208, 210, 212, 214) and the system would go back to step 201 for the creation of a new query, and repeating the subsequent steps. If the query is canceled in step 210, a check is made to see if the query is still running base on step 209. If it is, the query is stopped, and the process is returned to 201.

Once the result set is obtained, the database returns the result set to the server (step 211), which in turn, returns the result set to the user at the client computer (step 213). Once the result set has been received by the client, the process flow continues by determining the end-user's Authority Set (step 300) so the row indicator values can be determined when loading the query result set into the Data Manipulator.

300—INITIALIZE AUTHORITY SET.

301—Data Manipulator receives query result set.

303—Client requests Authority Set from the server.

305—Server queries the Security Table for Authority Set.

307—Result set is returned to the server.

309—Result set is returned to client computer by server.

311—Read a Record from the Authority Set.

313—Is the record null? If no, continue to steps 315, 317 and back to step 311. If yes, the record is null, there are no more records to read and thus continue to step 319.

315—Does the record Fieldname exist in the table? If no, go back to step 311. If yes, go to step 317.

317—Process record to create Authority threads and then go back to step 311.

319—If record can be successfully read, then add authority threads to Authority View List.

321—Create Authority View.

400—LOAD DATA.

A critical feature of the Data Manipulator component of the invention is that it audits each row of the data result set to determine whether any "update" restrictions exist in relation to such data for the particular user. If the data row does not pass the Authority Audit, it is considered to be "restricted." That is, if it is determined that "update" restrictions do exist for the particular user, the Data Manipulator sets the row to a "restricted" state which means that such row cannot be updated, inserted, or deleted by this end user. The invention allows for the specification of multiple values for a certain field by adding additional entries that have the same USER_ID, QUAD_NAME, ROLE_NAME, FIELD_NAME and AUTH_NO, but differing VALUE_AUTH_S. Alternatively, the system may set a combination of authorities by specifying the same USER_ID, QUAD_NAME, ROLE_NAME and AUTH_NO.

Figure 6:
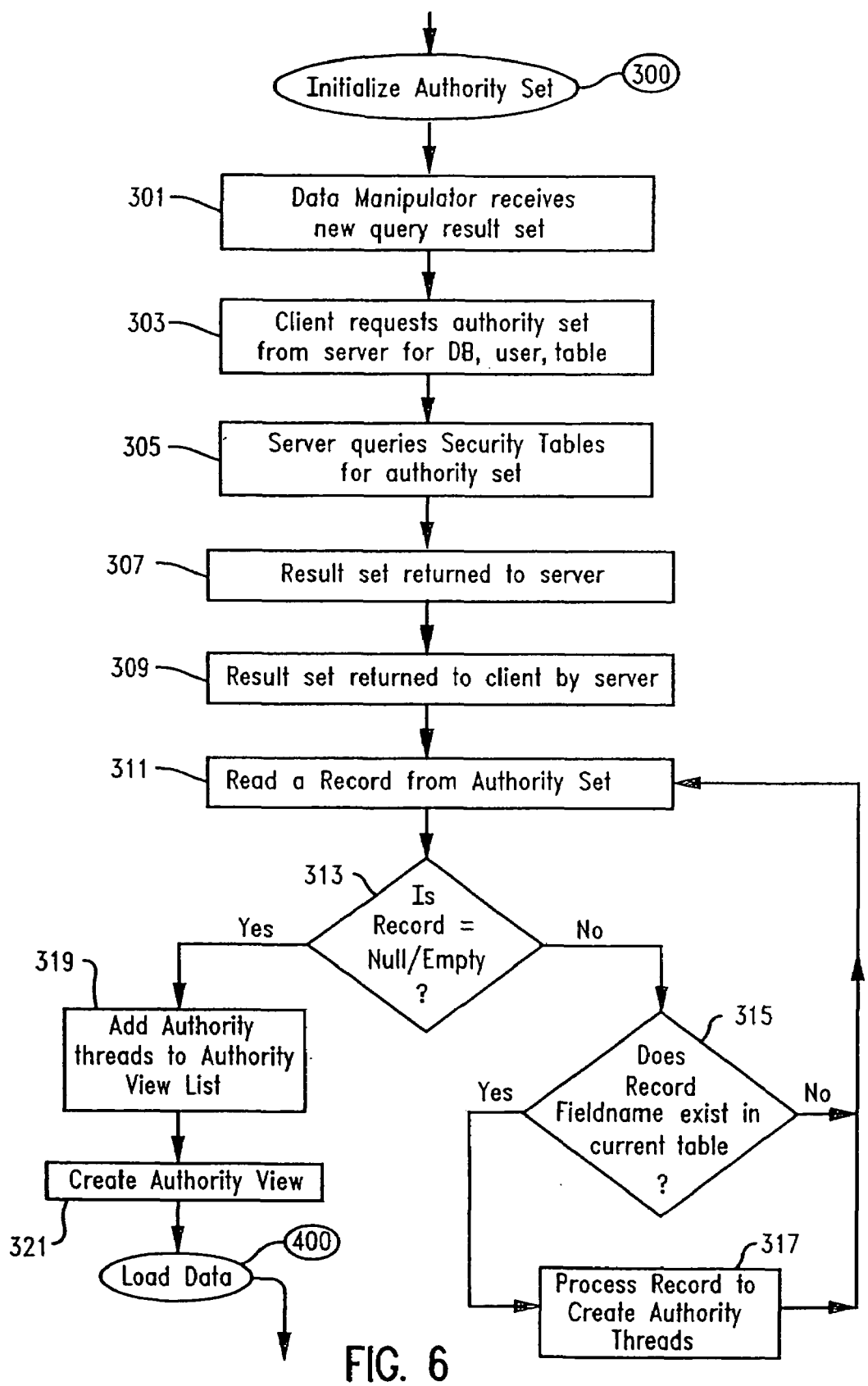
FIG. 6 is a continuation of the process flow of FIG. 5 illustrating the preferred process flow of the "Initialize Authority Set" portion of the process flow of FIG. 3.
Figure 7:
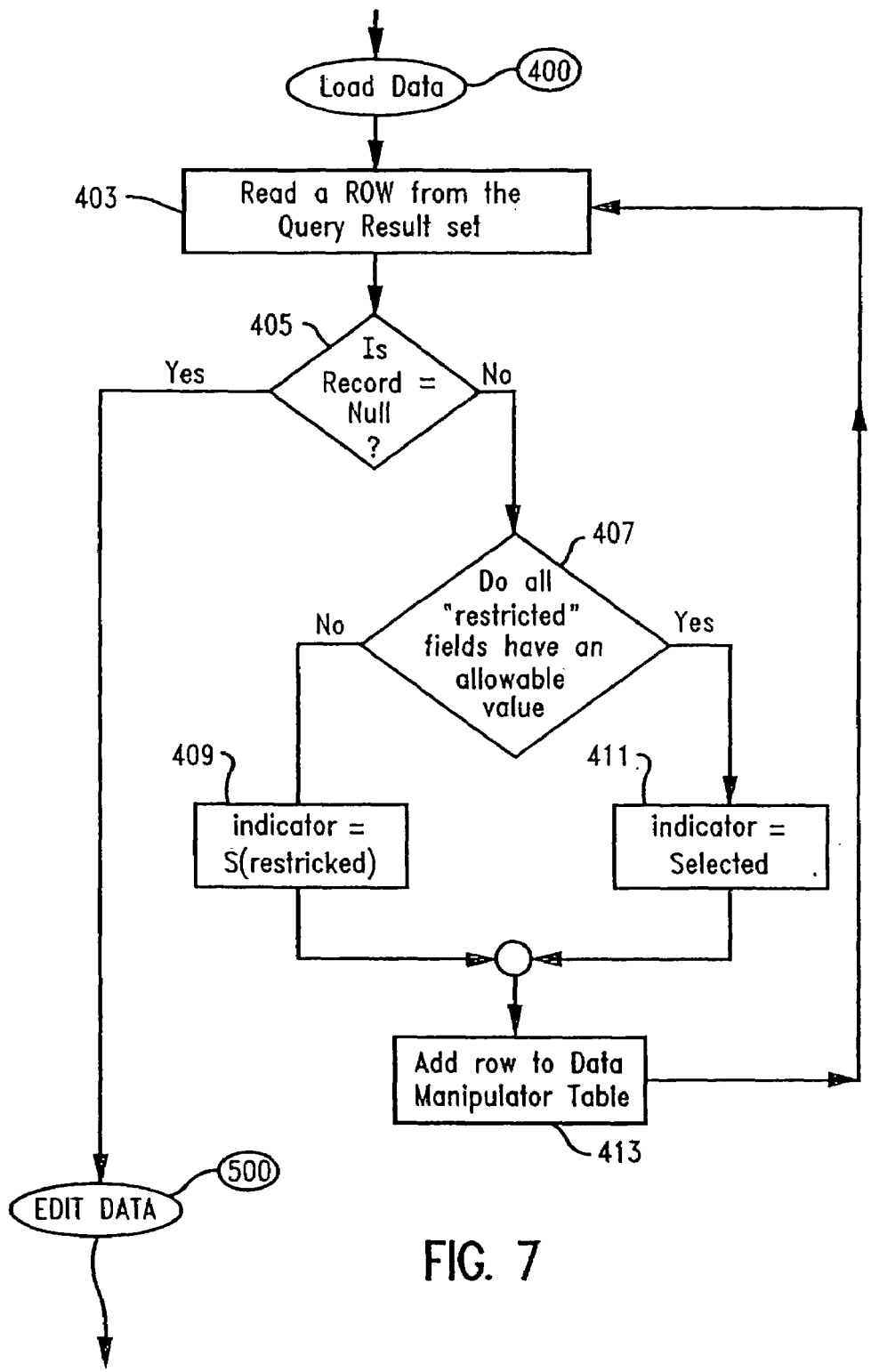
FIG. 7 is a continuation of the process flow of FIG. 6 illustrating the preferred process flow of the "Load Data" portion of the process flow of FIG. 3.
Figure 8:
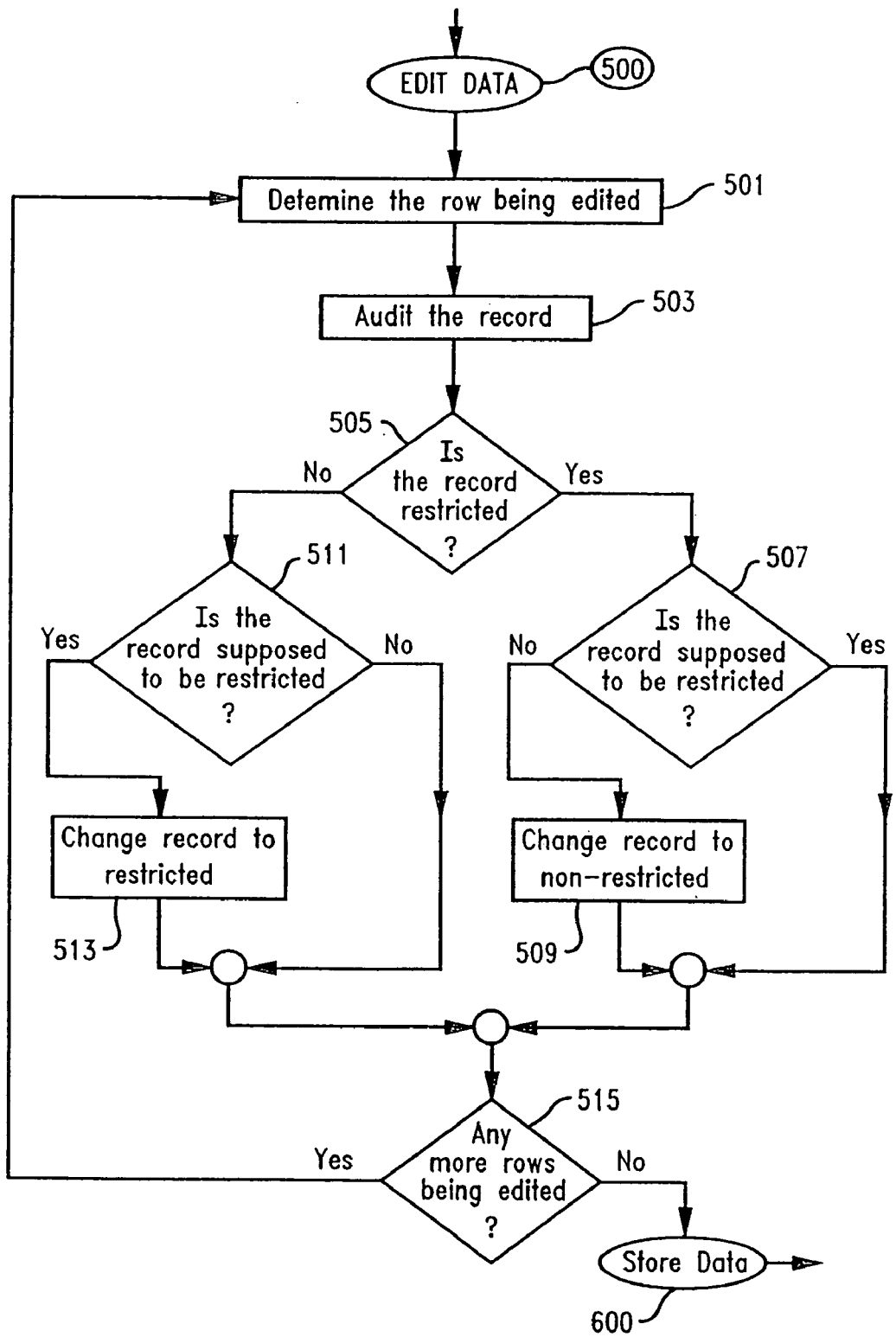
FIG. 8 is a continuation of the process flow of FIG. 7 illustrating the preferred process flow of the "Edit Data" portion of the process flow of FIG. 3.
Figure 9:
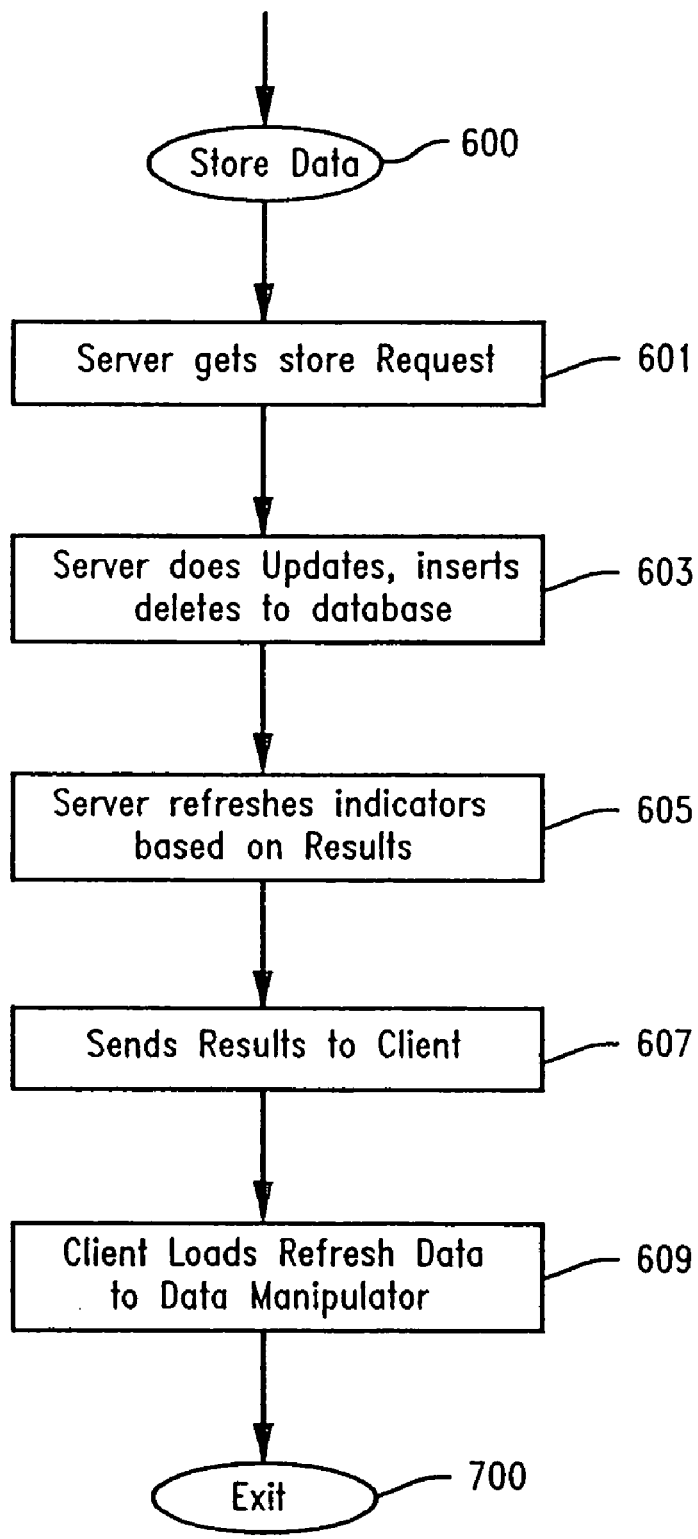
FIG. 9 is a continuation of the process flow of FIG. 8 illustrating the preferred process flow of the "Store Data" and "Exit" portions of the process flow of FIG. 3.

Referring to FIG. 6, once the Data Manipulator has the data result set, the Authority Set is then initialized to determine the Row Authorities (step 300). In the invention, a user has "read" access to all data within tables which the user has access to via the data administration tool component of the invention. However, as discussed above, an essential feature of the invention is that these accessible rows of data within the tables may by restricted from being updated or deleted by the end user based on the rules set-up within the instant security tables. The Data Manipulator is loaded with the query result set (step 301) after its indicator have been set by auditing each row with the rules determined by the Authority Set for the end-user that was requested from the server (step 303) for a specific userid and database. For example, the Security Table may be queried with the following query for retrieval of the Authority Set:

SELECT DISTINCT A.QUAD_NAME, A.ROLE_NAME, A.FIELD_NAME,
   A.VALUE_AUTH, A.AUTH_NO
   FROM SCPE.USER_ROLE_AUTH_S A, SCPE.ROLE_TABLE_REF_S B,
   SCPE.QUAD_S C
   WHERE A.USER_ID = 'userid'
   AND A.QUAD_NAME = C.QUAD_NAME
   AND A.QUAD_NAME = B.QUAD_NAME
   AND A.ROLE_NAME = B.ROLE_NAME
   AND B.TABLE_NAME = 'tableName'
   AND C.SUBSYSTEM = 'databaseName'
   ORDER BY A.AUTH_NO, A.ROLE_NAME, A.FIELD_NAME The retrieved Authority Set is then returned to the server (step 307), which returns such Authority Set to the user at the client computer (step 309). A record is selected (step 311) and then each row within the set is read (step 313). When a record is read, it is determined whether the record's field-name exists within the currently accessed table (step 315). If the field_name exists within the current table, the record is processed by determining which Authority Thread to place it in (step 317), and then the next record is read (steps 311, 313) and processed in the same manner. This process continues until no more records exist within the Authority Set. An authority thread is the set of records that are grouped by having the same composite, such as, QUAD_NAME, ROLE_NAME, AUTH_NO and the like. Once all the records have been read and the Authority Threads have been created, they are added to an Authority View list (step 319) and stored in the hashtable for later use and reference.

The system then creates a Row Authority Screen at the client computer for viewing by the user (step 321). This Row Authority Screen of step 321 allows the user to view the valid composite authorities they have, as set in accordance with the invention. That is, the Row Authority Screen shows the user the combination of values that pass the security audit in order to have the restriction lifted on a data row as defined later in this writing.

Once the Authority threads have been determined, the query result set is audited based on the authority threads while being loaded into the Data Manipulator (step 400).

400—LOAD DATA.

403—Read a "ROW" from the query result set.

405—Does record equal null? If no, continue to step 407. If yes, the record is null and continue to step 500.

407—Do all "restricted" fields have an allowable value? If no, continue to step 409. If yes, continue to step 411.

409—indicator = S(resctricted).

411—indicator = Selected.

413—Add row to Data Manipulator Table and continue back to step 403.

500—EDIT DATA.

Once the Authority threads are created, the query result set data is then loaded into the Data Manipulator component of the invention (step 400). In so doing, the Data Manipulator determines the set of authority threads (steps 300–321), and then each ROW of data is read from the query result set (step 403). If a record is empty, the process continues to step 500. Alternatively, if the record is not null/empty, then the process continues to step 407. In step 407, the data row is audited (step 407) and the indicator is set to "Selected" if the audit passes (step 411) or to "S(Restricted)" if the audit failed (step 409). After all the rows have been loaded the process goes to an Edit Data state (step 500).

The Data Manipulator contains the column called the "Indicator" column. This column indicates the state of a row, and is separate from the data retrieved from the database table. After the initial data load into the Data Manipulator, the indicator values will only be "Selected" or "S(Restricted)". The valid indicator values within the "indicator" column include the following:

| Indicator | Description |
| --- | --- |
| Select | A row that has been selected from the database. It is in an unedited state, and passes the Row Level Authorization audit. |
| Insert | A row that was either Inserted or Replicated by the end user and passes the Row Authorization audit. At store will be inserted into the database table. |
| Update | A row that had a cell edited by the end user and passes the Row Authorization audit. At store will be updated to the database table. |
| Delete | A row that was marked for Delete by the end user and passes the Row Authorization audit. At store will be deleted from the database table. |
| S (Restricted) | A row that has been selected from the database, is in an unedited state, and fails the Row Level Authorization audit |
| I (Restricted) | A row that was either Inserted or Replicated by the end user and fails the Row Authorization audit. |
| U (Restricted) | A row that had a cell edited by the end user and fails the Row Authorization audit. |
| I (Failed) | An Insert that failed when the Store action was taken. |
| U (Failed) | An Update that failed when the Store action was taken. |
| D (Failed) | A Delete that failed when the Store action was taken. |
| I (Stored) | An Insert that passed when the Store action was taken. |
| U (Stored) | An Update that passed when the Store action was taken. |

When data is initially loaded from a query, each row is audited against the hashtable that contains the authority threads. If a row passes the audit it is set with an indicator of 'Select' (step 411). Alterntively, if it failed the indicator is set to 'S(Restricted)' (step 409). The row of data is then added to the Data Manipulator table whereby a new Authority Set is created each time data is loaded as changes may have been made to the security tables of the invention (step 413). Once the data is sucessfuly read, it may then be edited (step 500).

500—EDIT DATA.

501—Determine the ROW being edited.

503—Audit the record.

505—Is the record restricted? If no, continue to step 511. If yes, continue to step 507.

507—Is the record supposed to be restricted? If no, continue to step 509. If yes, continue to step 515.

509—Change record to non-restricted.

511—Is the record supposed to be restricted? If yes, continue to step 513. If no, continue to step 515.

513—Change record to restricted.

515—Any more ROWs being edited? If no, continue to step 600. If yes, go back to step 501 and repeat susequent step for all ROWs being edited.

600—STORE DATA.

The Data Manipulator component listens for edits to the data stored therein the Data Manipulator table (step 500). The data ROW being edited is determined (step 501) and then such record is audited to determine whether it should be restricted or not restricted (step 503, 505).

If the record is restricted in step 505 ("Yes"), and it is determined that the record is not supposed to be restricted (step 507), then it is changed to a "non-restricted" state (step 509). Alternatively, if the record is restricted in step 505, and it is determined that the record is supposed to be restricted in step 507, then the process flow continues to step 515. If the record is not supposed to be restricted in step 505 ("No"), it is then determined whether the record is actually supposed to be restricted (step 511). If it is, then the record is changed to a restricted status (step 513), otherwise, if it is not then the process flow continues to step 515.

The process continues by determining whether there are any more rows being edited by the Data Manipulator after returning to a listen state (step 515). If more rows are to be edited, then the process flow returns to step 501 and continues the subsequent steps. If editing is complete, i.e., all rows have been edited, then the editing data is stored when the end-user prompts the action (step 600).

In performing the steps of editing the data (step 500), the Data Manipulator edits and audits the data each time a data row is changed based on the rules set forth in the below table.

| Indicator pre-edit state | pass audit | fail audit |
| --- | --- | --- |
| Select | Update | U (Restricted) |
| Insert | Insert | I (Restricted) |
| Update | Update | U (Restricted) |
| Delete | Warning Msg: (Row Marked for Delete) | Warning Msg: (Row Marked for Delete) |
| S (Restricted) | Error Msg: Not allowed to change a row you do not have authority to update | Error Msg: Not allowed to change a row you do not have authority to update |
| I (Restricted) | Insert | I (Restricted) |
| U (Restricted) | Update | U (Restricted) |
| I (Failed) | Insert | I (Restricted) |
| U (Failed) | Update | U (Restricted) |
| D (Failed) | Update | U (Restricted) |
| I (Stored) | Update | U (Restricted) |
| U (Stored) | Update | U (Restricted) |

In accordance with the invention, an insert row may be created by replicating a selected row. Further, an insert restricted row "I(Restricted)" may be created by replicating an S(Restricted) row. This I(Restricted) can then be edited to place valid values in the field, or fields creating the restriction, which will then create an insert once all fields pass the audit. An indicator of Delete is created by highlighting an unrestricted row or group of unrestricted rows and using a pushbutton or menu choice or an accelerator key to mark the row for delete. A row marked with an indicator of Delete can be returned to its previous indicator value by marking the row or group of Delete rows and using a pushbutton or menu choice or an accelerator key to undelete the row.

600—STORE DATA.

601—Server gets store request.

603—Server does updates, inserts, deletes to database.

605—Server refreshes indicators based on results.

607—Sends results to client.

609—Client loads refresh data to Data Manipulator.

700—EXIT.

When the end-user has finished editing their data, they will generally perform a store action (step 600) to save their changes to the database. The server gets the "store" requests (step 601), and then any rows having an Indicator of Insert will be inserted into the current table, likewise any rows marked with an Indicator of Update will have that row updated in the table, and any rows that have an Indicator of Delete will be deleted from the table (step 603). All other Indicator types will be ignored during the store action.

In so doing, the Data Manipulator sends the row set to the server (step 601), and in turn, the server performs the Insert, Update and Delete against the target table in the database (step 603). The server code performs the update indicators of each row being processed. In particular, rows that have been successfully 'inserted' to the table will have the Indicator changed to I(Stored), while unsuccessfully inserted rows will have the Indicator changed to I(Failed). Likewise, rows that have been successfully 'updated' to the table will have the Indicator changed to U(Stored), while those that have been unsuccessfully updated will have the Indicator changed to U(Failed). For the rows having an Indicator of Delete, all successful deletes will be removed from the row set and any unsuccessful deletes will have the indicator changed to D(Failed). These results are all post-storage indicator states that can be changed by the server depending on whether the store action passed or failed, as demonstrated in the below table.

| Action | Action Successful | Action Fail |
|---|---|---|
| Insert | I (Stored) | I (Failed) |
| Update | U (Stored) | U (Failed) |
| Delete | row no longer exists | D (Failed) |

The server continually refreshes the indicators based on any updated results (step 605), and sends these results to the client (step 607) whereby the client loads the refresh data into the data manipulator for processing (step 609). Once all data is stored, the user can then exit the system (step 700).

In order to better understand the invention, a series of examples of the instant row authority security scheme are provided below. In these examples, various role authority scenarios are exhibited in accordance with the invention in relation to the sample data as shown in FIG. 10.

EXAMPLE 1

| | | USER_ROLE_AUTH_S | | | |
|---|---|---|---|---|---|
| USER_ID | Role_Name | Quad_Name | Field_Name | Value_Auth | Auth_No |
| NLICIS | CAPACITY | SCPE | * | * | 1 |

Example 1 above illustrates that a user of the invention (NLICIS) is allowed to access and update any record in any of the tables that are listed within table ROLE_TABLE_REF_S matching in fields Role_Name and Quad_Name. As denoted by the universal update field authority "*", the user is unrestricted and can therefore access and update any record with any field name listed in table ROLE_TABLE_REF_S matching in fields Role_Name and Quad_Name. In this example, the user has read and alter capabilities to all the tables in SCPE.ROLE_TABLE_REF_S where the ROLE_NAME = 'CAPACITY' and the QUAD_NAME = 'SCPE', i.e., the first eleven tables within SCPE.ROLE_TABLE_REF_S as shown in FIG. 10.

EXAMPLE 2

| | | USER_ROLE_AUTH_S | | | |
|---|---|---|---|---|---|
| USER_ID | Role_Name | Quad_Name | Field_Name | Value_Auth | Auth_No |
| NLICIS | CAPACITY | SCPE | LOC | * | 1 |

Example 2 above illustrates that the user (NLICIS) is allowed to access and update any record in any of the tables that are listed within ROLE_TABLE_REF_S matching in Role_Name and Quad_Name. If the table has the column name LOC they can alter any row because of the universal update field authority "*". Any table that does not have the column LOC can have any row altered by the user based on this thread. Users may prefer example 1 having the universal update field authority "*" as such users would be unrestricted from updating a desired field within an accessed table. However, this example is illustrated as an alternative to example 1 for the "administrator" to setup their data. Generally, all users of the invention would have a record with a Field_Name of 'LOC' and this would clearly identify that NLICIS has carte blanche access based on that field.

EXAMPLE 3

| | | USER_ROLE_AUTH_S | | | |
|---|---|---|---|---|---|
| USER_ID | Role_Name | Quad_Name | Field_Name | Value_Auth | Auth_No |
| NLICIS | CAPACITY | SCPE | LOC | TH01 | 1 |

Example 3 above illustrates that the user (NLICIS) is allowed to access and update records with LOC=TH01 for any tables listed in ROLE_TABLE_REF_S matching on Role_Name and Quad_Name and having column name LOC. If a table existed for that Role_name, Quad_Name that did not have the field LOC, the user would have full access to such table therein being able to both read and alter any data row in such table. As used herein, the term "full access" refers to a user being able to read, insert, update and delete data from a table. That is, if the user reads data from a table not having a column name LOC whereby the table resides in ROLE_TABLE_REF_S and matches on Role_Name and Quad_Name, in accordance with the invention, the user would be able to alter all data in that table.

EXAMPLE 4

USER_ROLE_AUTH_S

| USER_ID | Role_Name | Quad_Name | Field_Name | Value_Auth | Auth_No |
|---|---|---|---|---|---|
| NLICIS | CAPACITY | SCPE | LOC | TH01 | 1 |
| NLICIS | CAPACITY | SCPE | * | * | 1 |

Example 4 above illustrates that the user (NLICIS) is only allowed to access and update records with the column name LOC=TH01 for any tables listed in ROLE_TABLE_REF_S matching on Role_Name and Quad_Name. The first record is considered the user's original authorization configuration or setup for allowing the user to access and modify data fields within these tables listed in ROLE_TABLE_REF_S matching on Role_Name and Quad_Name with column name LOC=TH01. However, the second string of data within example 4 of the instant security scheme allows user (NLICIS) unrestricted access to update any record with any field name listed in table ROLE_TABLE_REF_S matching in fields Role_Name and Quad_Name. Preferably, this record is added temporarily to allow the user NLICIS to read and alter any tables found in ROLE_TABLE_REF_S where ROLE_NAME = 'CAPACITY' and QUAD_NAME = 'SCPE'. The administrator is given the authority to return NLICIS to the original authorization where NLICIS can only alter rows with LOC='TH01'. This authority includes the administrator deleting the second authority row in example 4.

EXAMPLE 5

USER_ROLE_AUTH_S

| USER_ID | Role_Name | Quad_Name | Field_Name | Value_Auth | Auth_No |
|---|---|---|---|---|---|
| NLICIS | CAPACITY | SCPE | LOC | TH01 | 1 |
| NLICIS | CAPACITY | SCPE | LOC | SU01 | 1 |

Example 5 above illustrates that the user (NLICIS) is only allowed to access and update records with the column name of LOC, whereby the column names are either "LOC=TH01" or "LOC=SU01", for any tables listed in ROLE_TABLE_REF_S matching on Role_Name and Quad_Name. Again, if a table existed for that Role_name, Quad_Name that did not have the field LOC, the user would have full access to that table as described above in relation to example 3.

EXAMPLE 6

USER_ROLE_AUTH_S

| USER_ID | Role_Name | Quad_Name | Field_Name | Value_Auth | Auth_No |
|---|---|---|---|---|---|
| NLICIS | CAPACITY | SCPE | LOC | TH01 | 1 |
| NLICIS | CAPACITY | SCPE | STAGE | HSA_ISO_ASM | 1 |

Example 6 above illustrates that the user (NLICIS) is only allowed to read records for any tables listed in ROLE_TABLE_REF_S matching on Role_Name and Quad_Name. If a table has both the LOC field and the STAGE field, the row audit would pass only if LOC = 'TH01' and STAGE = 'HSA_ISO_ASM'. If a table has only one of the two fields listed in this example, then that field would only be used for the row audit. That is, if a table has the field LOC and does not have the field STAGE, then the row would only pass the audit if LOC = 'TH01'. Similarly, if a table has the field STAGE and does not have LOC, then the row would only pass the audit if STAGE ='HSA_ISO_ASM'. If a table has neither field LOC or STAGE, then the user would have read and alter capabilities on that table.

EXAMPLE 7

USER_ROLE_AUTH_S

| USER_ID | Role_Name | Quad_Name | Field_Name | Value_Auth | Auth_No |
|---|---|---|---|---|---|
| NLICIS | CAPACITY | SCPE | LOC | TH01 | 1 |
| NLICIS | CAPACITY | SCPE | STAGE | HSA_ISO_ASM | 1 |
| NLICIS | CAPACITY | SCPE | STAGE | HDD_ASSEMBLY | 1 |

Example 7 above illustrates that the user (NLICIS) is only allowed to access and update records for any tables listed in ROLE_TABLE_REF_S matching on Role_Name and Quad_Name. Similarly, as in example 6 above, if a table has both the LOC field and the STAGE field, the row audit would pass only if LOC = 'TH01' and ( STAGE ='HSA_ISO_ASM' or STAGE = 'HDD_ASSEMBLY' ). If a table has only one of the two fields listed in this example, then that field would only be used for the audit. That is, if a table has the field LOC and does not have the field STAGE, then the row would only pass the audit if LOC = 'TH01'. Similarly, if a table has the field STAGE and does not have LOC, then the row would only pass the audit if STAGE = 'HSA_ISO_ASM' or STAGE = 'HDD_ASSEMBLY'. If a table has neither field LOC nor STAGE then the user would have read and alter capabilities on that table.

EXAMPLE 8

USER_ROLE_AUTH_S

| USER_ID | Role_Name | Quad_Name | Field_Name | Value_Auth | Auth_No |
|---|---|---|---|---|---|
| NLICIS | CAPACITY | SCPE | LOC | TH01 | 1 |
| NLICIS | CAPACITY | SCPE | STAGE | HSA_ISO_ASM | 1 |
| NLICIS | CAPACITY | SCPE | LOC | SU01 | 2 |
| NLICIS | CAPACITY | SCPE | STAGE | HDD_ASSEMBLY | 2 |

Example 8 above illustrates that the user (NLICIS) is only allowed to update records with a (LOC=TH01 and STAGE=HSA_ISO_ASM) or (LOC=SU01 and STAGE=HDD_ASSEMBLY) for any tables listed in ROLE_ TABLE_REF_S matching on Role_Name and Quad_Name that have a column name of LOC and a column name STAGE. If a table existed for that Role_name, Quad_Name that did not have either a field LOC and STAGE, that table would have full access by the user. This is the same in all the subsequent examples for which a table does not have a column name field as specified in the USER_ROLE_AUTH_S. In the above table, it is essential that the Auth_No be unique for each restriction thread that is setup in accordance with the invention. In this example, if a table existed for that Role_Name, Quad_Name that did not have a field LOC but has a field STAGE, that table would have restricted access based on the STAGE field. The user would only be able to update rows where STAGE=HSA_ISO_ASM or STAGE=HDD_ASSEMBLY. If a table existed for that Role_Name, Quad_Name that did not have a field STAGE but has a field LOC, that table would have restricted access based on the LOC field. The user would only be able to update rows where LOC=TH01 or LOC=SU01.

EXAMPLE 9

| USER_ROLE_AUTH_S | | | | | |
|---|---|---|---|---|---|
| USER_ID | Role_Name | Quad_Name | Field_Name | Value_Auth | Auth_No |
| NLICIS | CAPACITY | SCPE | LOC | HG01 | 1 |
| NLICIS | CAPACITY | SCPE | PROCESS | HDD_ARCHE | 1 |
| NLICIS | CAPACITY | SCPE | PROCESS | HDD_ARCHE-1 | 1 |
| NLICIS | CAPACITY | SCPE | LOC | SG01 | 2 |
| NLICIS | CAPACITY | SCPE | STAGE | HDD_ASSEMBLY | 2 |

Example 9 illustrates that the user (NLICIS) is only allowed to update records with a (LOC=HG01 and PROCESS in (HDD_ARCHE, HDD_ARCHE-1) or (LOC=SG01 and STAGE=HDD_ASSEMBLY), for any tables listed in ROLE_TABLE_REF_S matching on Role_Name and Quad_Name that have a column names LOC, STAGE and PROCESS.

If a table existed for that Role_name, Quad_Name that did not have a field LOC but has fields STAGE and PROCESS, that table would have restricted access based on the STAGE and PROCESS fields. The user would only be able to update rows where PROCESS in (HDD_ARCHE, HDD_ARCHE-1) and STAGE=HDD_ASSEMBLY.

If a table existed for that Role_name, Quad_Name that did not have a field PROCESS but has a field LOC and STAGE, that table would have restricted access based on the LOC and STAGE fields. The user would be able to update rows where (LOC=HG01) or (LOC=SG01 and STAGE=HDD_ASSEMBLY).

If a table existed for that Role_name, Quad_Name that did not have a field STAGE but has a field LOC and PROCESS, that table would have restricted access based on the LOC and PROCESS fields. The user would be able to update rows where (LOC=HG01 and (PROCESS = 'HDD_ARCHE' or PROCESS = 'HDD_ARCHE-1')) or (LOC=SG01).

If a table existed for that Role_name, Quad_Name that didn't have fields LOC and STAGE that table would have access by the PROCESS only. The user would be able to update rows where PROCESS = 'HDD_ARCHE' or PROCESS = 'HDD_ARCHE-1'.

If a table existed for that Role_name, Quad_Name that didn't have fields LOC and PROCESS that table would have access by the STAGE only. The user would be able to update rows where STAGE=HDD_ASSEMBLY.

If a table existed for that Role_name, Quad_Name that didn't have fields STAGE and PROCESS that table would have access by the LOC only. The user would be able to update rows where LOC=HG01 or LOC=SG01.

EXAMPLE 10

| USER_ROLE_AUTH_S | | | | | |
|---|---|---|---|---|---|
| USER_ID | Role_Name | Quad_Name | Field_Name | Value_Auth | Auth_No |
| NLICIS | CAPACITY | SCPE | LOC | HG01 | 1 |
| NLICIS | CAPACITY | SCPE | STAGE | HSA_ISO_ASM | 1 |
| NLICIS | CAPACITY | SCPE | LOC | HG01 | 2 |
| NLICIS | CAPACITY | SCPE | PROCESS | HDD_ARCHE | 2 |
| NLICIS | CAPACITY | SCPE | PROCESS | HDD_ARCHE-1 | 2 |
| NLICIS | CAPACITY | SCPE | LOC | SG01 | 3 |
| NLICIS | CAPACITY | SCPE | STAGE | HDD_ASSEMBLY | 3 |
| NLICIS | CAPACITY | SCPE | LOC | SG01 | 4 |
| NLICIS | CAPACITY | SCPE | PROCESS | HDD_DISCO | 4 |
| NLICIS | CAPACITY | SCPE | PROCESS | HDD_DISCO-3 | 4 |

Example 10 illustrates that the user (NLICIS) is only allowed to update records with a (LOC=HG01 and STAGE=HSA_ISO_ASM and PROCESS in (HDD_ARCHE, HDD_ARCHE-1)) or (LOC=SG01 and STAGE=HDD_ASSEMBLY and PROCESS in (HDD-DISCO, HDD-DISCO-3)), for any tables listed in ROLE_TABLE_REF_S matching on Role_Name and Quad_Name that have a column names LOC, STAGE and PROCESS.

If a table existed for that Role_name, Quad_Name that did not have a field LOC but has fields STAGE and PROCESS, that table would have restricted access based on the STAGE and PROCESS fields. The user would only be able to update rows where (STAGE=HSA_ISO_ASM and PROCESS in (HDD_ARCHE, HDD_ARCHE-1) or (STAGE=HDD_ASSEMBLY and PROCESS in (HDD-DISCO, HDD-DISCO-3)).

If a table existed for that Role_name, Quad_Name that did not have a field PROCESS but has fields LOC and STAGE, that table would have restricted access based on the LOC and STAGE fields. The user would only be able to update rows where (LOC=HG01 and STAGE=HSA_ISO_ASM) or (LOC=SG01 and STAGE=HDD_ASSEMBLY).

If a table existed for that Role_name, Quad_Name that did not have a field STAGE but has fields LOC and PROCESS, that table would have restricted access based on the LOC and PROCESS fields. The user would only be able to update rows where (LOC=HG01 and PROCESS in (HDD_ARCHE, HDD_ARCHE-1)) or (LOC=SG01 and PROCESS in (HDD-DISCO, HDD-DISCO-3)).

If a table existed for that Role_name, Quad_Name that did not have fields LOC and STAGE that table would have access by the PROCESS only. The user would only be able to update rows where PROCESS in (HDD_ARCHE, HDD_ARCHE-1,HDD-DISCO, HDD-DISCO-3).

If a table existed for that Role_name, Quad_Name that did not have fields LOC and PROCESS that table would have access by the STAGE only. The user would only be able to update rows where STAGE=HSA_ISO_ASM or STAGE=HDD_ASSEMBLY.

If a table existed for that Role_name, Quad_Name that did not have fields STAGE and PROCESS that table would have access by the LOC only. The user would only be able to update rows where LOC=HG01 or LOC=SG01.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

The invention claimed is:

1. A method for securing data within a table on a database residing on a server using a security scheme, comprising:
   providing at least one security table residing on a database, said at least one security table having limit rules for evaluating and monitoring a user's authorities based on a composite of fields within said security table;
   accessing at least one table residing on said database by said user;
   evaluating whether said user is authorized to access said at least one table, read data within said table and modify a subset of said data in said at least one table by said at least one security table applying said limit rules to said user's authorities based on said composite of fields within said security table; and
   permitting said user to access said at least one table, read said data within said table and modify said subset of data if said user is determined to be an authorized user based on said composite of fields.

2. The method of claim 1 further including said at least one security table automatically opening and closing access to said at least one table to prevent locking said table from access by other users.

3. The method of claim 2 wherein said at least one security table automatically opens and closes access to said at least one table by setting flags for a session of said security scheme.

4. The method of claim 1 further including said at least one security table automatically opening and closing access to at least one cell within said at least one table.

5. The method of claim 1 further including providing a plurality of security tables residing on said database whereby each of said plurality of security tables include limit rules for restricting user read and modify abilities wherein said security scheme is implemented on said plurality of security tables simultaneously.

6. The method of claim 1 wherein said subset of data is selected from the group consisting of an entire data row, a portion of a data row, a plurality of differing data rows and a plurality of differing portions of data rows.

7. The method of claim 1 wherein said plurality of fields are selected from a variety of differing field names existing within said table residing on said database.

8. The method of claim 1 wherein said user is selected from the group consisting of a system end user or a system administrator.

9. The method of claim 1 wherein the step of accessing said at least one table residing on said database by said user comprises:
   displaying a logon screen on a client computer accessible by said user having a displayed database list;
   selecting a desired database from the displayed database list by said user whereby said database has a plurality of tables;
   logging onto said selected database by said user;
   validating that said user is authorized to access said database;
   querying said at least one security table to determine selected ones of said plurality of tables that said user is authorized to access, read and modify subsets of data therein said selected ones of tables; and
   said server retrieving a quad list from said database comprising at least one subset of tables of said selected ones of said plurality of tables that said user is authorized to access, read and modify.

10. The method of claim 9 wherein the step of querying said at least one security table further comprises:
   determining whether said at least one subset of tables that said user has authority for is available in said database; and
   if said least one subset of tables is available, allowing said user to access, read and modify said subset of data within said selected at least one table from said subset of tables.

11. The method of claim 9 wherein the step of querying said at least one security table further comprises:
   determining whether said at least one subset of tables that said user has authority for is available in said database; and
   if said least one subset of tables is not available, determining whether said user has override privileges for said at least one subset of tables;
   if said user has override privileges, allowing said user to access, read and modify said subset of data within said selected at least one table from said subset of tables.

12. The method of claim 9 wherein the step of evaluating said user once said user logs onto said security scheme comprises:
   assigning said user to a user role, said user role defining a plurality of read authorities and alter authorities for said user;
   determining a user authority set for each of said user authorized tables from said quad list by associating said user with said assigned user role; and
   auditing said user authority set against said composite of fields within said security table for said selected at least one table to determine said subset of data within said selected table that said user is allowed to modify.

13. The method of claim 12 wherein the step of permitting said user to access said table, read said data and modify said subset of data comprises:
   selecting said at least one table from a table list having all tables said user has authority to access and read, said table list displayed at said client computer and residing in a query generator;
   creating a query in said query generator by said user;
   retrieving a result set from said query generator, said result set comprising a set of column definitions and rows of said at least one table;
   creating a row authority list for said user by auditing said result set against said composite of fields, said row authority list comprising a composite of valid authorities within said at least one table that said user is allowed to modify;
   editing said subset of data within said at least one table whereby said system audits said subset of data to ensure that said user has a valid authority from said composite of valid authorities thereby being authorized to modify said subset of data;

storing all modifications to said subset of data within said at least one table once all editing is complete.

14. A computer program product for securing data within a table on a database residing on a server using a security scheme, the computer program product comprising computer readable program code means for providing at least one security table residing on a database, said at least one security table having limit rules for evaluating and monitoring a user's authorities based on a composite of fields within said security table;

computer readable program code means for accessing at least one table residing on said database by said user;

computer readable program code means for evaluating whether said user is authorized to access said at least one table, read data within said table and modify a subset of said data in said at least one table by said at least one security table applying said limit rules to said user's authorities based on said composite of fields within said security table; and computer readable program code means for permitting said user to access said at least one table, read said data within said table and modify said subset of data if said user is determined to be an authorized user based on said composite of fields.

15. The computer program product of claim 14 wherein the computer program product further comprises:

computer readable program code means for displaying a logon screen on a client computer accessible by said user having a displayed database list;

computer readable program code means for selecting a desired database from the displayed database list by said user whereby said database has a plurality of tables;

computer readable program code means for logging onto said selected database by said user;

computer readable program code means for validating that said user is authorized to access said database;

computer readable program code means for querying said at least one security table to determine selected ones of said plurality of tables that said user is authorized to access, read and modify subsets of data therein said selected ones of tables; and computer readable program code means for retrieving a quad list from said database comprising at least one subset of tables of said selected ones of said plurality of tables that said user is authorized to access, read and modify.

16. The computer program product of claim 15 wherein the computer program product further comprises:

computer readable program code means for assigning said user to a user role, said user role defining a plurality of read authorities and alter authorities for said user;

computer readable program code means for determining a user authority set for each of said user authorized tables from said quad list by associating said user with said assigned user role; and computer readable program code means for auditing said user authority set against said composite of fields within said security table for said selected at least one table to determine said subset of data within said selected table that said user is allowed to modify.

17. The computer program product of claim 16 wherein the computer program product further comprises:

computer readable program code means for selecting said at least one table from a table list having all tables said user has authority to access and read, said table list displayed at said client computer and residing in a query generator;

computer readable program code means for creating a query in said query generator by said user;

computer readable program code means for retrieving a result set from said query generator, said result set comprising a set of column definitions and rows of said at least one table;

computer readable program code means for creating a row authority list for said user by auditing said result set against said composite of fields, said row authority list comprising a composite of valid authorities within said at least one table that said user is allowed to modify;

computer readable program code means for editing said subset of data within said at least one table whereby said system audits said subset of data to ensure that said user has a valid authority from said composite of valid authorities thereby being authorized to modify said subset of data;

computer readable program code means for storing all modifications to said subset of data within said at least one table once all editing is complete.

18. A program storage device readable by a machine, tangibly embodying a program of instructions executable by the machine to perform method steps for securing data within a table on a database residing on a server using a security scheme, said method steps comprising:

providing at least one security table residing on a database, said at least one security table having limit rules for evaluating and monitoring a user's authorities based on a composite of fields within said security table;

accessing at least one table residing on said database by said user;

evaluating whether said user is authorized to access said at least one table, read data within said table and modify a subset of said data in said at least one table by said at least one security table applying said limit rules to said user's authorities based on said composite of fields within said security table; and permitting said user to access said at least one table, read said data within said table and modify said subset of data if said user is determined to be an authorized user based on said composite of fields.

19. The program storage device of claim 18 wherein the method steps further comprise:

assigning said user to a user role, said user role defining a plurality of read authorities and alter authorities for said user;

determining a user authority set for each of said user authorized tables from said quad list by associating said user with said assigned user role; and auditing said user authority set against said composite of fields within said security table for said selected at least one table to determine said subset of data within said selected table that said user is allowed to modify.

20. The program storage device of claim 19 wherein the method steps further comprise:

selecting said at least one table from a table list having all tables said user has authority to access and read, said table list displayed at said client computer and residing in a query generator;

creating a query in said query generator by said user;

retrieving a result set from said query generator, said result set comprising a set of column definitions and rows of said at least one table;

creating a row authority list for said user by auditing said result set against said composite of fields, said row authority list comprising a composite of valid authorities within said at least one table that said user is allowed to modify;

editing said subset of data within said at least one table whereby said system audits said subset of data to ensure that said user has a valid authority from said composite of valid authorities thereby being authorized to modify said subset of data;

storing all modifications to said subset of data within said at least one table once all editing is complete.

* * * * *